(12) United States Patent
Hassan

(10) Patent No.: US 12,363,517 B2
(45) Date of Patent: Jul. 15, 2025

(54) COMMUNICATION DEVICE, SYSTEM AND METHOD

(71) Applicant: ADEPT TECH SOLUTIONS INC., Pleasanton, CA (US)

(72) Inventor: Syed Ali Hassan, Islamabad (PK)

(73) Assignee: Adept Tech Solutions Inc., Pleasanton, CA (US)

( * ) Notice: Subject to any disclaimer, the term of this patent is extended or adjusted under 35 U.S.C. 154(b) by 0 days.

(21) Appl. No.: 17/077,157

(22) Filed: Oct. 22, 2020

(65) Prior Publication Data
US 2021/0337366 A1    Oct. 28, 2021

Related U.S. Application Data

(60) Provisional application No. 63/015,084, filed on Apr. 24, 2020.

(51) Int. Cl.
*H04W 4/70* (2018.01)
*H04W 4/06* (2009.01)
*H04W 52/02* (2009.01)
*H04W 76/11* (2018.01)

(52) U.S. Cl.
CPC ............ *H04W 4/70* (2018.02); *H04W 4/06* (2013.01); *H04W 52/0261* (2013.01); *H04W 76/11* (2018.02)

(58) Field of Classification Search
CPC ......... H04W 4/023; H04W 4/06; H04W 4/70; H04W 4/90; H04W 8/005; H04W 40/22; H04W 52/0261; H04W 76/11; H04W 76/14; H04W 84/18; Y02D 30/70
See application file for complete search history.

(56) References Cited

U.S. PATENT DOCUMENTS

| | | | |
|---|---|---|---|
| 9,693,325 B1* | 6/2017 | Park | H04W 56/0005 |
| 2013/0316727 A1* | 11/2013 | Edge | H04W 76/14 |
| | | | 455/456.1 |
| 2014/0162688 A1* | 6/2014 | Edge | H04W 4/06 |
| | | | 455/456.1 |
| 2016/0100355 A1* | 4/2016 | Chen | H04W 72/1215 |
| | | | 370/232 |

(Continued)

*Primary Examiner* — Marcus Smith
*Assistant Examiner* — Kai Chang
(74) *Attorney, Agent, or Firm* — Cook Alex Ltd.

(57) ABSTRACT

A computer-implemented device-to-device (D2D) communication method includes broadcasting, by a device, device information of the device at periodic time intervals using device-to-device (D2D) communication, receiving, by the device, the device information in an incoming new device broadcast sequence, and receiving, by the device, compiled device information in an incoming D2D broadcast sequence. The compiled device information includes device information of respective devices of a plurality of devices communicating using the D2D communication. The plurality of devices include the device and one or more additional devices. The computer-implemented method further includes storing, by the device, the compiled device information, determining, by the device, a broadcast sequence based on the compiled device information, and broadcasting, by the device, compiled device information of at least one device of the plurality of devices according to the determined broadcast sequence.

5 Claims, 17 Drawing Sheets

(56) References Cited

U.S. PATENT DOCUMENTS

| | | | |
|---|---|---|---|
| 2016/0150390 A1* | 5/2016 | Chen | H04W 8/24 |
| | | | 370/328 |
| 2016/0157254 A1* | 6/2016 | Novlan | H04W 72/02 |
| | | | 370/329 |
| 2016/0269486 A1* | 9/2016 | Gupta | H04W 4/70 |
| 2016/0302247 A1* | 10/2016 | Lu | H04W 8/005 |
| 2017/0086082 A1* | 3/2017 | Narayanan | H04W 40/34 |
| 2017/0201875 A1* | 7/2017 | Lee | G06Q 10/10 |
| 2017/0278378 A1* | 9/2017 | Kaplita | G08B 25/005 |
| 2018/0041889 A1* | 2/2018 | Chen | H04W 92/18 |
| 2019/0253868 A1* | 8/2019 | Zalzalah | H04W 76/14 |
| 2020/0092685 A1* | 3/2020 | Fehrenbach | H04W 84/047 |
| 2020/0100177 A1* | 3/2020 | Balasubramanian | H04W 52/327 |

* cited by examiner

| Device ID | Visible | Not Visible |
|---|---|---|
| 1 | 2,5 | 3,4,6,7,8,9,10,11,12, 13,14,15,16,17,18,19,20, 21,22,23,24 |
| 2 | 6,3,1 | 4,5,7,8,9,10,11, 12,13,14,15,16,17,18, 19,20, 21,22,23,24 |
| 3 | 2,6,7 | 1,4,5,8,9,10,11,12, 13,14,15,16,17,18,19,20, 21,22,23,24 |
| 4 | 5 | 1,2,3,6,7,8,9,10,11,12, 13,14,15,16,17,18,19,20, 21,22,23,24 |
| 5 | 1,4,6,9 | 2,3,7,8,10,11,12, 13,14,15,16,17,18,19,20, 21,22,23,24 |
| 6 | 7,5,3,2 | 1,4,8,9,10,11,12, 13,14,15,16,17,18,19,20, 21,22,23,24 |
| 7 | 3,6,8,10 | 1,2,4,5,9,11,12, 13,14,15,16,17,18,19,20, 21,22,23,24 |
| 8 | 7 | 1,2,3,4,5,6,9,10,11,12, 13,14,15,16,17,18,19,20, 21,22,23,24 |
| 9 | 5,10 | 1,2,3,4,6,7,8,11,12, 13,14,15,16,17,18,19,20, 21,22,23,24 |
| 10 | 11,9,7 | 1,2,3,4,5,6,8,12, 13,14,15,16,17,18,19,20, 21,22,23,24 |
| 11 | 10,12 | 1,2,3,4,5,6,7,8,9, 13,14,15,16,17,18,19,20, 21,22,23,24 |
| 12 | 13,11 | 1,2,3,4,5,6,7,8,9,10, 14,15,16,17,18,19,20, 21,22,23,24 |
| 13 | 12,14 | 1,2,3,4,5,6,7,8,9,10,11, 15,16,17,18,19,20, 21,22,23,24 |
| 14 | 15,13 | 1,2,3,4,5,6,7,8,9,10,11,12, 16,17,18,19,20, 21,22,23,24 |
| 15 | 14,16,18 | 1,2,3,4,5,6,7,8,9,10,11,12, 13,17,19,20, 21,22,23,24 |
| 16 | 18,17,15 | 1,2,3,4,5,6,7,8,9,10,11, 12,13,14,19,20, 21,22,23,24 |
| 17 | 16,18,19,20 | 1,2,3,4,5,6,7,8,9,10,11, 12,13,14,15,21,22,23,24 |
| 18 | 20,17,16,15 | 1,2,3,4,5,6,7,8,9,10,11,12, 13,14,19,21, 22,23,24 |
| 19 | 17,20 | 1,2,3,4,5,6,7,8,9,10,11,12, 13,14,15,16,18, 21,22,23,24 |
| 20 | 22,21,19,18,17 | 1,2,3,4,5,6,7,8,9,10,11,12, 13,14,15,16,23,24 |
| 21 | 20 | 1,2,3,4,5,6,7,8,9,10,11,12, 13,14,15,16,17,18,19, 22,23,24 |
| 22 | 23,20 | 1,2,3,4,5,6,7,8,9,10,11,12, 13,14,15,16,17,18,19, 21,24 |
| 23 | 22 | 1,2,3,4,5,6,7,8,9,10,11,12, 13,14,15,16,17,18,19,20, 21,24 |
| 24 | NIL | 1,2,3,4,5,6,7,8,9,10,11,12, 13,14,15,16,17,18,19,20, 21,22,23 |

FIG. 9

| Device ID | TTL | SoH |
|---|---|---|
| 18 | 32 hours | 99% |
| 16 | 30 hours | 100% |
| 20 | 28 hours | 92% |
| 21 | 27 hours | 97% |
| 14 | 26 hours | 98% |
| 23 | 24 hours | 96% |
| 13 | 23 hours | 94% |
| 25 | 22 hours | 99% |
| 22 | 21 hours | 91% |
| 19 | 20 hours | 90% |
| 15 | 18 hours | 80% |
| 17 | 17 hours | 84% |
| 9 | 15 hours | 87% |
| 10 | 14 hours | 66% |
| 11 | 12 hours | 40% |
| 6 | 10 hours | 58% |
| 12 | 9 hours | 44% |
| 5 | 8 hours | 10% |
| 8 | 7 hours | 29% |
| 7 | 6 hours | 27% |
| 4 | 4 hours | 13% |
| 3 | 3 hours | 6% |
| 1 | 2 hours | 10% |
| 2 | 1 hour | 11% |

FIG. 10

| Active device | Broadcast sequence |
|---|---|
| 1 | 1,3,4,17,19,11,9,12,16,11,18,10,1,19,17,15,18,10,9,17,15,22,23,13,21,16,1,20,16,1,13,15 |
| 2 | 2,4,5,7,8,3,5,12,13,10,2,9,17,15,18,19,2,23,13,24,14,21,19,17,18,20,2,18,6,2,3,2,1 |
| 3 | 3,1,3,4,3,6,3,5,3,12,3,11,3,10,3,9,3,17,3,18,3,19,3,22,3,23,3,13,3,4,3,14,3,21,3,20,3,16,3,18,3,2,3,7,3,6 |
| 4 | 4,2,4,1,4,3,4,7,4,8,4,12,4,6,4,11,4,10,4,9,4,17,4,22,4,15,4,19,4,22,3,21,4,19,4,15,4,21,30,4,10,4,18,4,5 |
| 5 | 5,3,3,5,7,5,8,5,12,5,11,5,10,5,19,5,22,5,15,5,19,5,23,5,13,5,24,5,12,5,15,5,20,5,10,5,15,5,4,5,6,5,9 |
| 6 | 6,1,6,4,6,9,6,12,6,11,6,0,6,9,6,17,6,15,6,19,6,22,5,13,6,24,6,14,6,21,6,15,6,20,6,10,6,16,6,6,5,6,7,6,3,6,6 |
| 7 | 7,2,3,14,7,5,7,13,15,7,11,7,7,2,7,16,7,24,7,14,7,15,20,7,16,7,20,7,14,7,15,7,7,4,7,3,7,6,7,11,9 |
| 8 | 8,2,8,1,8,3,8,4,8,5,8,12,8,6,8,11,8,10,8,8,9,17,8,15,8,19,8,22,8,23,8,13,8,24,8,14,8,8,20,8,16,8,18,8,9,7 |
| 9 | 9,2,9,1,9,3,9,4,9,7,9,8,9,12,9,6,9,11,9,10,9,17,9,15,9,19,9,22,9,23,9,13,9,24,9,14,9,21,9,20,9,16,9,18,9,5,9,10 |
| 10 | 10,2,10,1,10,3,10,4,10,5,10,12,10,6,10,11,10,9,10,17,10,15,10,19,10,22,10,23,10,8,10,24,11,10,21,10,14,10,20,10,16,10,18,10,7 |
| 11 | 10,16,10,18,10,9,10,11,18,7 |
| 12 | 11,2,11,3,11,4,11,17,11,8,11,15,11,6,11,9,11,17,11,15,11,19,11,22,11,23,11,13,11,24,11,14,11,21,11,12,11,18,11,9,14 |
| 13 | 20,11,18,21,18,11,12,11,10 |
| 14 | 12,2,11,2,12,4,12,7,12,8,12,5,12,6,12,9,12,17,12,15,12,19,12,22,12,23,12,8,12,24,12,14,12,21,12,12,13 |
| 15 | 20,12,18,12,18,12,11 |
| 16 | 13,2,13,1,13,3,13,4,13,5,13,6,13,7,13,8,13,9,13,11,13,10,13,15,13,19,13,22,13,13,13,24,13,14,13,21,13,20,13,16,13,18,13,14 |
| 17 | 20,13,16,13,18,13,12,13,14 |
| 18 | 14,2,14,3,14,14,7,14,8,12,14,6,14,11,14,5,14,12,14,6,14,14,4,14,19,14,9,14,22,14,23,14,13,14,9,14,14,20,14,16,14,18,14,21,14 |
| 19 | 20,14,16,14,18,14,13,14,15 |
| 20 | 15,2,15,3,15,4,15,7,15,8,15,12,15,6,15,11,15,5,15,14,15,13,15,9,15,10,15,16,15,19,15,22,15,23,15,13,15,20,15,16,15,18,15,15 |
| 21 | 21,15,20,15,14,15,16,15,10 |
| 22 | 16,2,16,1,16,3,16,4,16,6,16,7,16,8,16,11,16,9,16,10,16,15,16,11,16,19,16,22,16,23,16,13,16,24,16,14,16,16 |
| 23 | 21,16,20,16,18,16,15,16,17 |
| 24 | 17,2,17,1,17,3,17,4,17,7,17,8,17,12,17,11,17,6,17,5,17,9,17,15,17,11,17,19,17,22,17,23,17,13,17,24,17,14,17,17 |
| 25 | 21,17,19,17,20,17,16,17,18 |
| 26 | 18,2,18,1,18,3,18,4,18,7,18,8,18,12,18,11,18,5,18,18,19,18,22,18,23,18,13,18,24,18,14,18,18 |
| 27 | 21,18,16,18,20,18,15,18,17 |
| 28 | 19,2,19,3,19,4,19,9,19,7,19,8,19,12,19,5,19,11,19,10,19,17,19,22,19,23,19,13,19,24,19,14,19,19 |
| 29 | 21,19,16,19,18,19,17,19,20 |
| 30 | 20,2,20,1,20,3,20,4,20,7,20,8,20,5,20,12,20,6,20,11,20,10,20,9,20,11,20,23,20,13,20,24,20,14,20,20 |
| 31 | 18,20,21,20,22,20,19,20,17 |
| 32 | 21,2,21,3,21,4,21,7,21,8,21,5,21,12,21,11,21,6,21,10,21,9,21,17,21,15,21,21,19,21,22,21,15,21,13,21 |
| 33 | 24,21,14,21,16,21,18,21,20 |
| 34 | 22,2,22,1,22,3,22,4,22,7,22,8,22,5,22,12,22,6,22,11,22,10,22,9,22,17,22,15,22,19,22,23,22,13,22,22 |
| 35 | 21,22,16,22,18,22,20,22,23 |
| 36 | 23,2,23,1,23,3,23,4,23,7,23,8,23,5,23,12,23,10,23,9,23,17,23,11,23,19,23,22,23,13,23,15,23,14,23,23 |
| 37 | 21,23,20,23,16,23,18,23,22 |

FIG. 11

COMMUNICATION DEVICE, SYSTEM AND METHOD

BACKGROUND

The following description relates generally to a communication device, system and method, for example, a communication device, system and method for device-to-device (D2D) communications.

A wireless communication device, such as a mobile phone, may be connected to a communication network, such as a cellular network. The wireless communication device can be connected to the communication network by connecting to communication network infrastructure, such as a cellular base station installed at a cellular tower. A cellular base station of the communication network infrastructure may be communicably connected to numerous wireless communication devices within range of the base station. Thus, for cellular communication, the wireless communication devices rely on a cellular connection to a centralized, infrastructure-dependent communication network.

In some instances, the communication network infrastructure may be taken offline or otherwise become unavailable, which would preclude cellular communication of the wireless communication devices in range of the communication network infrastructure. For example, an emergency scenario, such as a natural disaster, may damage the communication network infrastructure and preclude cellular communications to and from the wireless communication devices in range of the now-offline communication network infrastructure.

In an emergency or natural disaster, first responders may need to communicate with persons in the affected area and/or locate persons in the affected area. However, with communication network infrastructure offline and cellular communications to/from the wireless communication devices limited, the first responders may need to expend significant time and/or resources to search the affected area.

EP Pat. No. 2 800 442 B1 ("EP '442") relates to device-to-device communication between wireless devices particularly in emergency and disaster scenarios. In EP '442, a wireless communication method includes operating one or more base stations with wireless links for downlink communications with a plurality of terminals, the one or more base stations broadcasting a trigger signal which is an emergency notification, and in response to the trigger signal, operating at least a first terminal in a first mode in which a device-to-infrastructure, D2I, wireless link is used for uplink communications with the base station, and operating at least a second terminal in second mode in which a device-to-device, D2D, wireless link is used for uplink communications, wherein the first terminal relays to the base station over the D2I wireless link communications received from the second terminal via the D2D wireless link. However, the communications in EP '442 rely on network infrastructure, i.e., the base station, require connections between terminals and infrastructure, and lack redundancy in data collection.

Accordingly, it is desirable to provide communication devices, systems and methods for providing decentralized, infrastructure independent and connectionless communications between multiple wireless communication devices, for example, when communication network infrastructure is offline or otherwise inoperable.

SUMMARY

According to one aspect, a computer-implemented device-to-device (D2D) communication method includes broadcasting, by a device, device information of the device at periodic time intervals using device-to-device (D2D) communication, receiving, by the device, the device information in an incoming new device broadcast sequence, and receiving, by the device, compiled device information in an incoming D2D broadcast sequence. The compiled device information includes device information of respective devices of a plurality of devices communicating using the D2D communication. The plurality of devices including the device and one or more additional devices. The computer-implemented method further includes storing, by the device, the compiled device information, determining, by the device, a broadcast sequence based on the compiled device information, and broadcasting, by the device, compiled device information of at least one device of the plurality of devices according to the determined broadcast sequence.

The method may further include determining whether the compiled device information includes device information of a new device. In response to determining the compiled device information includes device information of a new device, the method may also include determining the broadcast sequence includes a new device broadcast sequence. Broadcasting device information of at least one device of the plurality of devices according to the determined broadcast sequence may include broadcasting device information of the new device according to the new device broadcast sequence. Determining the broadcast sequence may further include determining a D2D broadcast sequence of the stored compiled device information. Broadcasting device information of at least one additional device of the plurality of devices according to the determined broadcast sequence may further include broadcasting the stored compiled device information according to the D2D broadcast sequence.

The method may also include determining a D2D broadcast sequence of the stored compiled device information. Broadcasting device information of at least one additional device of the plurality of devices according to the determined broadcast sequence may include broadcasting the stored compiled device information according to the D2D broadcast sequence.

The method may further include receiving, by the device, updated compiled device information in an updated incoming D2D broadcast sequence. The updated compiled device information may include updated device information of respective devices of the plurality of devices. The method may further include storing, by the device, the updated compiled device information, determining, by the device, an updated D2D broadcast sequence based on the updated compiled device information, and broadcasting, by the device, the updated device information according to the updated D2D broadcast sequence.

The method may also include transmitting, by the device, the compiled device information to a mobile information collection device. The device information may include device ID information, location information, proximity information and battery information. Determining the broadcast sequence may include determining a D2D broadcast sequence based on one or more of the proximity information and the battery information. The proximity information may include information indicating which devices of the plurality of devices are visible and which are non-visible to the device. The battery information may include time-to-live (TTL) information of a device battery.

The method may further include activating a D2D mode. The device information of the device may be broadcasted in response to activating the D2D mode.

According to another aspect, a device has a processor and a computer-readable medium communicably coupled to the processor and configured to store executable program instructions that when executed by the processor cause the device to: broadcast device information of the device at periodic time intervals using device-to-device (D2D) communication, receive the device information in an incoming new device broadcast sequence, and receive compiled device information in an incoming D2D broadcast sequence. The compiled device information includes the device information of respective devices of a plurality of devices communicating using the D2D communication. The plurality of devices include the device and one or more additional devices. The processor further causes the device to store the compiled device information, determine a broadcast sequence based on the compiled device information, and broadcast device information of at least one device of the plurality of devices according to the determined broadcast sequence.

The processor may further cause the device to determine whether the compiled device information includes device information of a new device. In response to determining the compiled device information includes device information of a new device, the processor may cause the device to determine the broadcast sequence includes a new device broadcast sequence. The processor may also cause the device to broadcast the device information of the new device according to the new device broadcast sequence. The processor may also cause the device to receive device information of a new device, and broadcast the device information of the new device according to a new device broadcast sequence.

Other objects, features, and advantages of the disclosure will be apparent from the following description, taken in conjunction with the accompanying sheets of drawings, wherein like numerals refer to like parts, elements, components, steps, and processes.

BRIEF DESCRIPTION OF THE DRAWINGS

FIG. 9 is a table showing an example of visible devices and non-visible devices in an example of a D2D virtual mesh network;

FIG. 10 is a table showing examples of battery information including TTL and SoH for devices in a D2D virtual mesh network;

FIG. 11 is a table showing an example of a D2D broadcast sequence for devices in a D2D virtual mesh network;

DETAILED DESCRIPTION

Figure 1A:
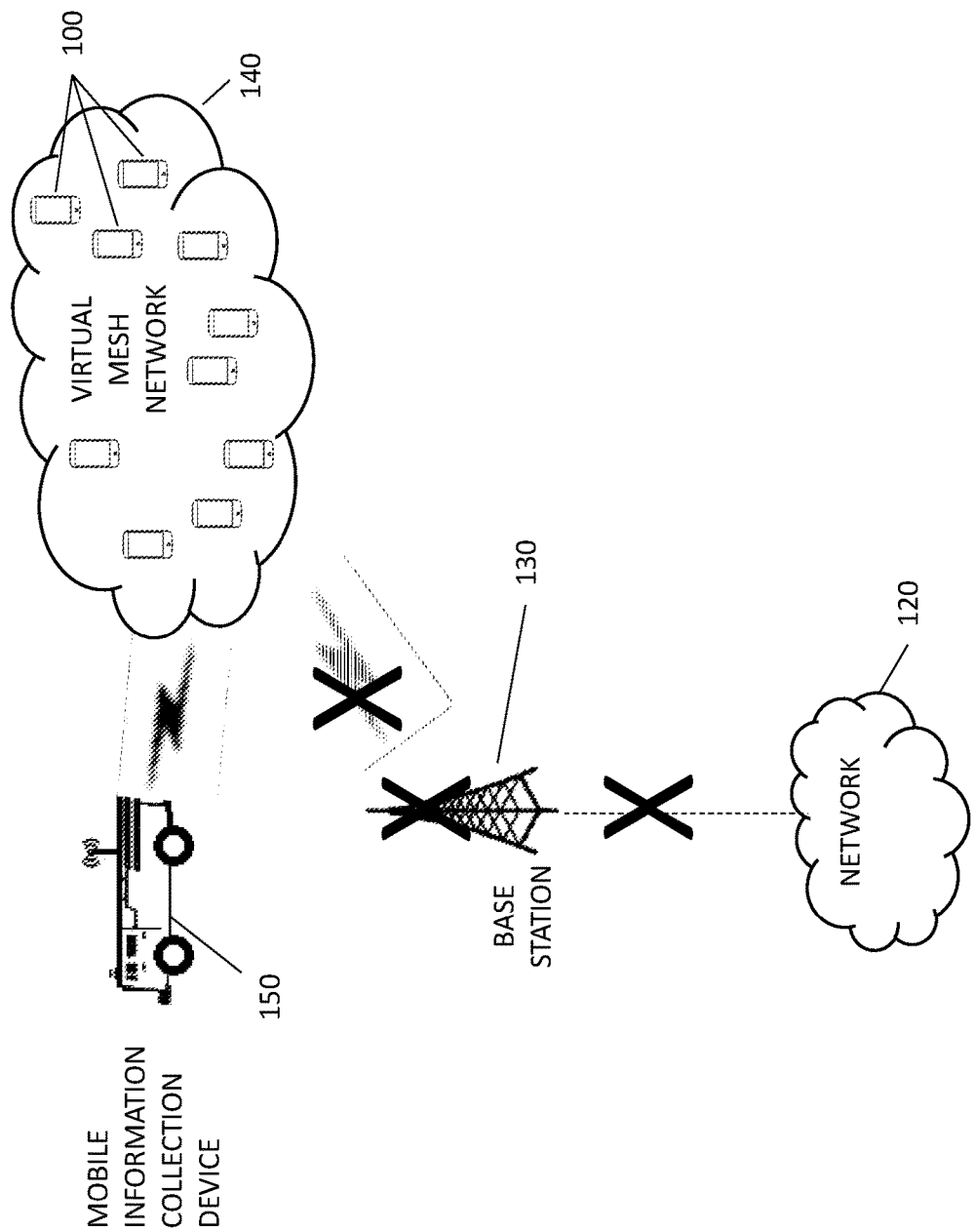
FIG. 1A is a diagram illustrating an example of a device, system and method for device-to-device (D2D) communications, according to embodiments.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Low powered communication technologies offering robust connectivity may be useful for information gathering and monitoring. In embodiments herein, such communication technologies may be implemented in a device-to-device (D2D) connectionless communication protocol in which broadcast packets communicate device information of active devices in relative areas of coverage. The broadcast packets may be, for example, beacon advertisements. The devices are configured to generate and maintain (i.e., update and/or store) a table of other devices communicating in a D2D virtual mesh to form a connectionless D2D virtual mesh network.

Since the devices in the network are configured to collect and maintain device information of the devices in the network, the device information for each device is redundant. The device information may include device information of a device itself as well as device information of the other devices communicating in the D2D virtual mesh network. The redundancy of device information may allow for reliable information gathering. Information gathering may be performed by broadcasting, from a transmitting device, different types of packets that include information regarding, for example, the identification, battery, location of the transmitting device, as well as proximity information of other devices relative to the transmitting device. The broadcast information may be received and stored at the other devices and then rebroadcast by those other devices. In this manner, the device information may be received by additional devices in the D2D outside of the range of the initial transmitting device.

In an embodiment, the information of devices in the range of the broadcasting device (visible devices) and of the devices not in the direct range of the broadcasting device (non-visible devices), may be transmitted with different packets so that the packets can be recognized and stored accordingly. Packets may also be generated and used to allow users of the devices to send text messages to other user devices in the D2D virtual mesh network. Further, another packet may be used by a device in the network with a low battery to alert other devices in the network. The devices may use the battery information, e.g., the low battery alert, to update a priority of the low battery device in their respective tables of stored device information.

Devices may be activated for D2D communications according to the connectionless communication protocol of the present embodiments for example, by user input, by receiving a broadcast from a network provider, by sensing broadcasts from nearby devices, and/or in the event of communication network infrastructure failure.

The collected device information of the devices in the D2D virtual mesh network may be transmitted to an information collection device, such as a server, access point, base station, or other mobile or portable electronic communication device suitable for receiving the transmitted information. The information collection device may be positioned with and/or accessible to authorized personnel, such as a first responder, volunteer, aid worker or the like. The device information may be accessed via the information collection device by the authorized personnel. For example, a first responder may be deployed with the information collection device to an affected area where the D2D virtual mesh network is active, such that at least one device of the D2D virtual mesh network may communicably connect with and transmit the collected device information to the information collection device. In this manner, authorized personnel may access location information of the devices and deploy physical resources, such as personnel, equipment, supplies and the like to those locations. In addition, allocation of such resources may be prioritized, for example, based on the battery information.

The devices of the D2D virtual mesh network may be de-activated from the D2D mode. For example, a device may be triggered to delete all collected device information upon deactivation. It is envisioned that the D2D connectionless communication protocol described herein may be used, for example, in emergency or disaster scenarios, or other scenarios in which cellular connectivity is lost, to exchange information regarding the identity and location of the devices and users of the devices.

In some embodiments, the devices may communicate using Bluetooth technologies. For compatibility with a wide range of devices, the devices, systems and methods of embodiments herein may use information packets designed to have 20 bytes.

FIG. 1A is a diagram illustrating an example of a device, system and method according to embodiments described herein. A plurality of devices 100 may be configured for communication over a network 120, via a cellular connection to network infrastructure 130, such as a cellular base station at a cellular tower. However, if the cellular base station 130 is taken offline, for example, in an emergency event such as a natural or man-made disaster, or other cellular blackout scenario, then the device 100 becomes disconnected from the network 120 absent any other operable cellular base station within range of the device. FIG. 1A illustrates the base station 130 being taken offline and connections between the devices 100 and base station 130 and the base station 130 and the network 120 being interrupted.

In an embodiment, a device-to-device (D2D) virtual mesh network 140 includes a plurality of devices 100 each configured to broadcast, receive and store device information of the devices 100 communicating in the D2D virtual mesh network 140. The broadcast may be a beacon having an advertisement. A mobile information collection device 150 may be moved into range of at least one device 100 communicating in the D2D virtual mesh network 140 and may receive the device information of the devices 100 in the D2D virtual mesh network 140 from the at least one device 100. The mobile information collection device 150 may be positioned, for example, with a first responder vehicle, including local, regional, state and federal agency vehicles and/or may be carried by authorized personnel.

For example, the mobile information collection device 150 may located at a firetruck, police car, aircraft (including UAVs), ambulance, ATV and the like. Accordingly, personnel authorized to access information received by the mobile information collection device 150 may review the device information and acquire the location (or estimated or approximate) location of each device 100, as well as other relevant device information. In this manner, physical resources, such as first responders, may be dispatched to the locations of the devices 100. In an embodiment, a device 100 of the D2D virtual mesh network 140 may serve as the mobile information collection device 150. In this manner, an operator of a device 100 may volunteer to review the collected device information of the devices 100 in the D2D virtual mesh network 140. Accordingly, the volunteer may attempt to locate and assist operators of the other devices 100 communicating in the D2D virtual mesh network 140.

Figure 1B:
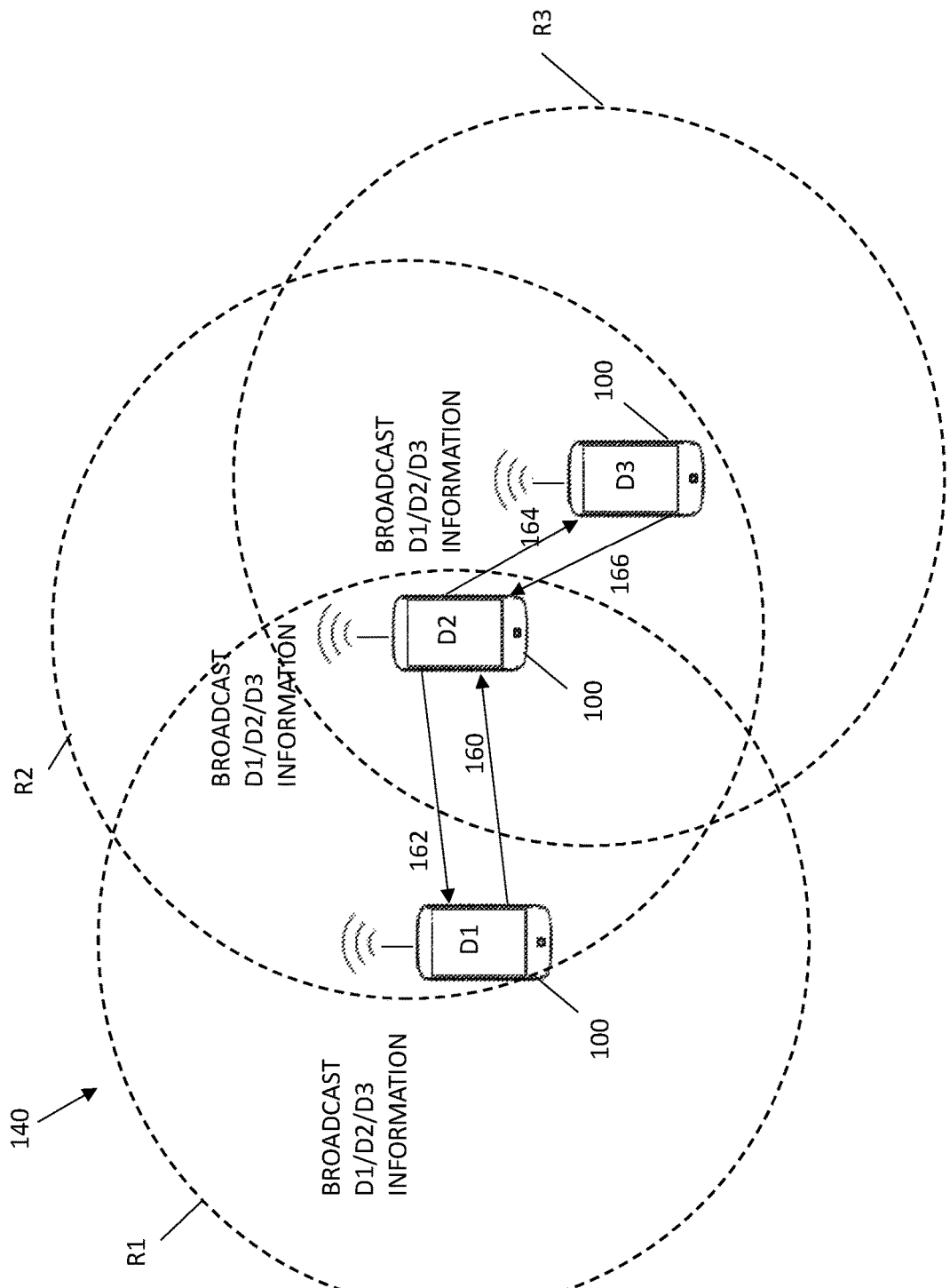
FIG. 1B is a diagram illustrating examples of devices in a D2D virtual mesh network.

FIG. 1B is a diagram illustrating examples of devices 100 in the D2D virtual mesh network 140. Each device 100, labeled separately as D1, D2, D3, for example, may broadcast device information, including its own device information as well as device information received from the other devices 100 in the D2D virtual mesh network 140. A device 100 is configured to broadcast the device information over a range for the device. For example, D1 may broadcast over range R1, D2 over range R2, and D3 over range R3 as shown in FIG. 1B. The broadcast device information may be received directly by another device positioned within the range of the broadcasting device 100. The broadcast device information from one device, i.e., the broadcasting device 100, may be broadcast to an out-of-range device 100 through one or more intermediate devices 100 positioned with the range of the broadcasting device 100.

For example, at 160, device information broadcast from D1 may be received directly by D2 because D2 is positioned within range R1 of D1. Similarly, at 162 device information broadcast from D2 may be received directly by D1 because D1 is positioned within range R2 of D2. At 164, device information broadcast from D2 may be received directly by D3 because D3 is positioned within range R2. In addition, the device information broadcast from D1 (at 160) may be received at D3 via a broadcast from D2 (at 164). Similarly, at 166, device information broadcast from D3 may be received directly at D2 since D2 is positioned within range R3 of D3. Device information broadcast from D3 may be received at D1 via a broadcast from D2 (at 162).

Figure 2:
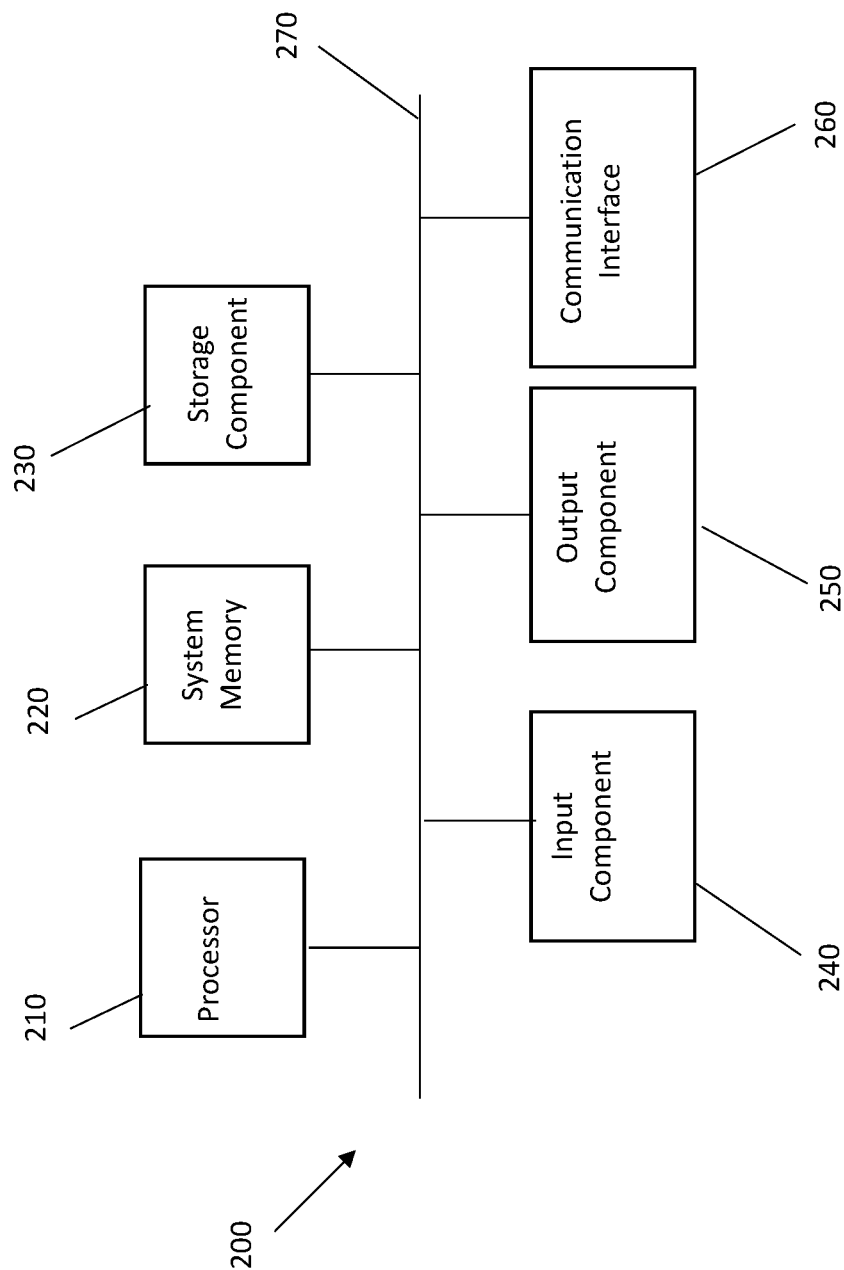
FIG. 2 is a diagram illustrating components of a device according to an embodiment.

FIG. 2 is a diagram showing components of a device 200 according to embodiments. The device 200 may correspond to or be implemented as, for example, a device 100, a base station 130 and/or a mobile information collection device 150. The device 200 may include a processor 210, a system memory 220, a storage component 230, an input component 240, an output component 250 and a communication interface 260. The device 200 may further include a bus 270 connected to and allowing communication between the processor 210, the system memory 220, the storage component 230, the input component 240, the output component 250 and the communication interface 260.

The processor 210 may be a computer processor such as a microprocessor, a microcontroller or other suitable processor configured to interpret and execute program instructions. The system memory 220 may include a read only memory (ROM), a random-access memory (RAM) or other suitable memory configured for storing information and/or program instructions to be executed by the processor 210. The system memory 220 may be a suitable non-transitory computer-readable medium.

The storage component 230 is configured to store software or other information which may be executed by the processor 210 to control operations of the device 200. The storage component 230 may also store information which may be selectively accessed, updated, edited, reviewed, referenced, analyzed, sent, received and the like, by one or more of a user, the processor 210, the program instructions, software and the like. The storage component 230 may be, for example, a suitable non-transitory computer-readable medium such as a hard disk or other known, suitable storage disk or medium.

Input component 240 is configured to receive information to the device 200. The input component 240 may include, for example, one or more of a keyboard, keypad, touch screen display, input knob, button or switch, joystick, pointing device such as a mouse, microphone, biometric sensor, camera or other photosensor, global positioning system (GPS) receiver, accelerometer, and/or other known, suitable components for receiving information in a device. In an embodiment, the input computer 240 may be a user interface device configured to interact with a user and may convert an interaction with the user to information input to the device 200.

Output component 250 is configured to output information from the device 200 and may include, for example, a display screen, a light-emitting diode(s) (LED), a tactile or haptic component, an audio speaker, and/or other known, suitable components for providing information to a user or other device.

The communication interface 260 is configured to allow the device 200 to communicate (i.e., to send and receive information) with other devices, including but not limited to other devices connected within a network. The communication interface may include, for example, a transceiver or similar component configured to enable wireless communication of the device 200. For example, the communication interface 260 may include for Radio Frequency (RF) transceiver to facilitate communication over, for example, a cellular network, WiFi network, and other similar communication networks. In an embodiment, the communication interface 260 may include a beacon transmitter. Other wireless communications may be facilitated as well, including but not limited to, near field communication (NFC), Bluetooth communication including Bluetooth Low Energy (BLE), and the like. For example, the communication interface 260 can include a Bluetooth module. The communication interface 260 may also facilitate wired communication. For example, the communication interface 260 may include one or more wired interfaces for Ethernet, universal serial bus (USB), coaxial and/or optical cable connections, and/or other similar, suitable wired connections.

Figure 3:
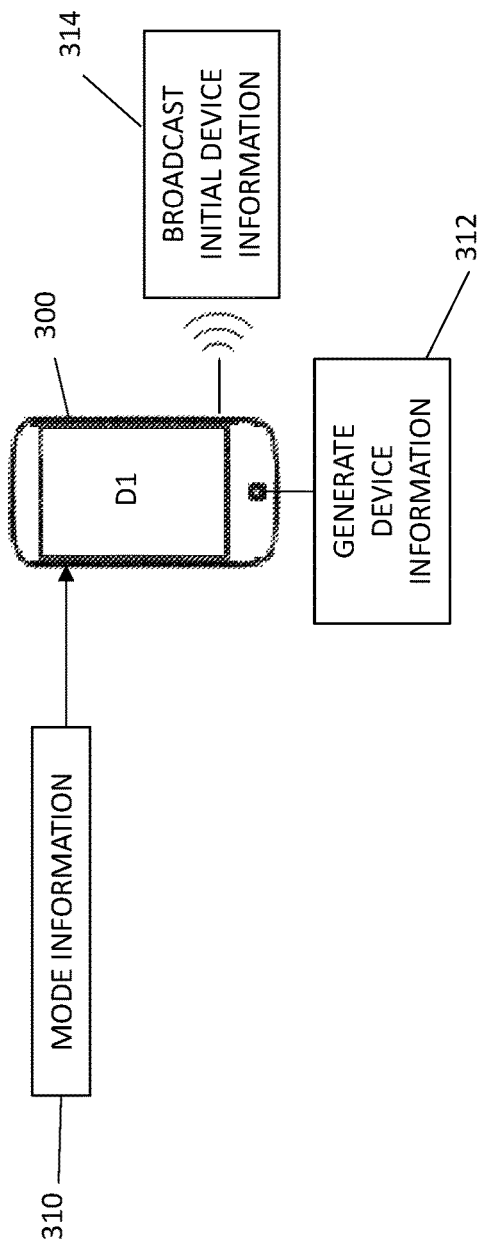
FIG. 3 is a diagram illustrating a device according to an embodiment.

FIG. 3 is a diagram illustrating a device 300 according to an embodiment. The device 300 may include some or all of the components and/or functionality of the devices described above, such as the components and/or functionality of the device 100 and/or the device 200. In an embodiment, the device 300 may be a portable electronic device, such as a mobile phone, smart phone, tablet computer, laptop computer, smart accessory such as a smart watch, and/or other connected device including wearable electronics and medical devices configured to receive and/or send information using, for example, wireless communication technologies, protocols and/or standards. In an embodiment, the device 300 is configured for connectivity to and communication over a cellular network and/or over a personal area network (PAN) using suitable communication technologies, protocols, standards and the like. In an embodiment, the device 300 may be configured for Bluetooth Low Energy (BLE) communications.

Referring still to FIG. 3, the device 300 is configured to receive mode information 310 to activate or deactivate a device-to-device (D2D) mode of the device 300. The mode information 310 may be received, for example, via the input component 240 and/or the communication interface 260. The mode information 310 may be, for example, an instruction received in the mode information or information which when received at the device 300, may be recognized, for example by the processor 210, as being information indicating that a D2D mode of the device 300 is to be activated or deactivated. In an embodiment, the mode information 310 may be a signal or absence of an expected signal.

In an embodiment, mode information 310 may be received as a user input, for example, at the input component 240. Accordingly, activation and/or deactivation of the D2D mode may be user controlled.

In an embodiment, mode information 310 may be received in a D2D broadcast. For example, the BLE module of a device 300 may start receiving BLE broadcasts from other devices as network infrastructure begins to fail. The device 300, for example, the processor 210 analyzing information received in the broadcasts, may recognize information contained in the broadcasts as mode information 310 and activate or deactivate the D2D mode accordingly. In this manner, the D2D mode may be activated automatically, i.e., without being initiated by the user of the device, and may be beneficial in scenarios where the user is unable to manually activate D2D mode of the device 300.

In an embodiment, mode information 310 may be received in response to communication network infrastructure failure. For example, if a signal or connection to the communication infrastructure is lost for a predetermined period of time, the device 300 may output a query to the user as to whether D2D mode is to be activated and the user may provide instruction to the device 300 to activate the D2D mode.

In an embodiment, the mode information 310 may be received in a broadcast from a network provider, for example, in special network broadcast to devices 300 in a particular area.

It is understood that the mode information 310 may be received at the device 300 according to any of the examples, or different combinations of the examples above.

The device 300 is configured to store, in the storage component 230, for example, permissions which allow the D2D mode of the device 300 to be activated in response to receiving the mode information 310. The permissions may include, for example, permission to use the communication interface 260 (including the Bluetooth module), permission to use location services, permission to use battery information, permission to the mobile number or other identification information associated with the device 300, permission to send and receive text messages, permission to display notifications, and permission to start/halt device services. Accordingly, in an embodiment, the device 300, for example, at the processor 210, may be configured to check for predetermined permissions stored in the storage component 230 before activating D2D mode. In the event a permission is not found, the device 300 may output a prompt to the user, by way of the output component 250, for example, requesting such permission.

With further reference to FIG. 3, in D2D mode, the device 300 may be configured to generate device information 312. The device information 312 may include, for example, device ID information, battery information, device proximity information and/or location information of the device 300. The device ID information may include, for example, a phone number associated with the device 300 and/or other identifying information associated with the device 300.

The battery information may include, for example, a time-to-live (TTL) of the device battery, a state-of-health (SoH) of the battery, or both. The TTL may identify, as a unit of time, a remaining battery life of the device 300. The SoH may identify a condition of the battery (or cell or battery pack) compared to the battery's ideal condition.

The device proximity information may indicate other devices in the D2D virtual mesh network identified as visible devices and other devices in the D2D virtual mesh network identified as non-visible devices. The device proximity information may include a number of visible and non-visible devices and/or device ID information of visible and non-visible devices in the D2D virtual mesh network.

The location information may include, for example, Global Positioning System (GPS) coordinates of the device 300 and/or geodetic information of the device. In an embodiment, the location information may be calculated or estimated based on the location information of other devices in the D2D virtual mesh network. In an embodiment, the location information may be determined by using a known ranging technique, such as RSSI fingerprinting, for example, when the geodetic coordinates of three other visible devices are known.

The device 300 may be configured to broadcast the device information 312. For example, the device 300 may broadcast the device information 312 using the communication interface 260. The device information 312 may be broadcast over a broadcast range for the device 300. In this manner, other active devices, i.e., devices operating in D2D mode, within the broadcast range of the device 300, i.e., visible devices, may directly receive the device information 312 broadcast by the device 300. The device information 312 may also be broadcast by the other devices within the broadcast range of the device 300, to further devices outside the broadcast range of the device 300, i.e., non-visible devices. The device information may be broadcast in one or more information packets. The broadcast range may by a physical area at least partially around the device 300. In an embodiment, the broadcast range may be measured as a distance.

Figure 4:
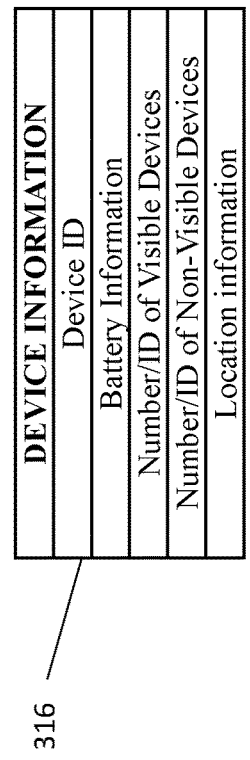
FIG. 4 is a table illustrating an example of device information for a device.

FIG. 4 is a table showing an example of the device information 312 for a device 300. In an embodiment, the device information 312 may be stored in one or more device information packets 316 to be broadcast by the device 300. In an embodiment, the device information 312 may be initial device information corresponding to device information of the device 300 at a time when the device 300 is activated to operate in D2D mode. The device 300 may broadcast initial device information 312, for example, after being activated for operating in D2D mode. The initial broadcast information 312 may omit the proximity information because the device 300 may not have received device information broadcast by other devices before the initial broadcast. The device 300 may update the device information to include proximity information after receiving device information from other devices communicating in the D2D virtual mesh network 140.

Figure 5:
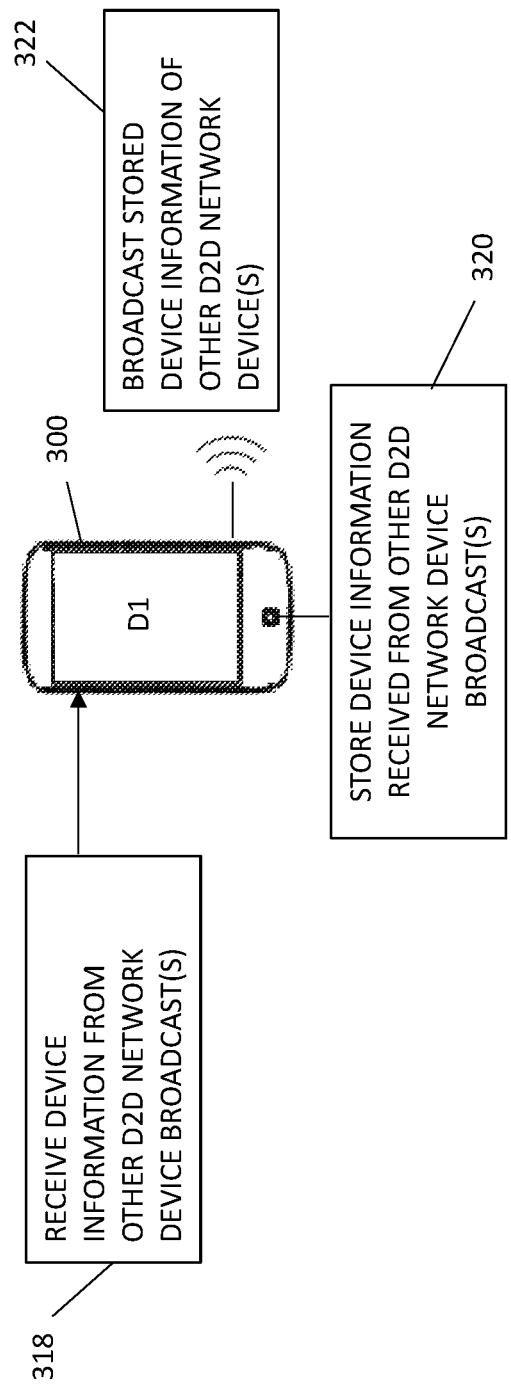
FIG. 5 is another diagram illustrating a device according to an embodiment.

FIG. 5 is another diagram illustrating the device 300 according an embodiment. The device 300 is also configured to receive, for example via the communication interface 260 and/or input component 240, device information broadcast from other D2D virtual mesh network devices 318. The device 300 may store the device information received from other D2D virtual mesh network device broadcasts 320. For example, the device 300 may receive device information broadcast from a visible device 300 in the D2D virtual mesh network 140 and store the received device information in the storage component 230. In an embodiment the received device information may include device information of the device broadcasting the device information, e.g., the visible device. The received device information may also include device information of other devices in the D2D virtual mesh network which had been received at the visible device. For example, in an embodiment, the received device information may include device information of some or all other devices in the D2D virtual mesh network 140, including visible and non-visible devices. The device information received by the device 300 may also include device information of the device 300 itself (i.e., the device receiving the device information), for example, because the device 300 may have previously transmitted its own device information which may have then been stored at another device 300 of the D2D virtual mesh network 140. The device information may be received over a series of broadcasts. The device 300 may store the received device information in the device information logs. In an embodiment, the device information for visible devices and the device information for non-visible devices may be stored in separate device information logs.

The device 300 may be configured to broadcast the stored device information, i.e., the received device information for other devices in the D2D virtual mesh network 322, as well as its own device information. In a D2D virtual mesh network having a plurality of devices configured in the manner described herein, device information of the plurality of devices in the D2D virtual mesh network may be stored at each device in the D2D virtual mesh network or a subset of devices communicating in the D2D virtual mesh network.

Figure 6:
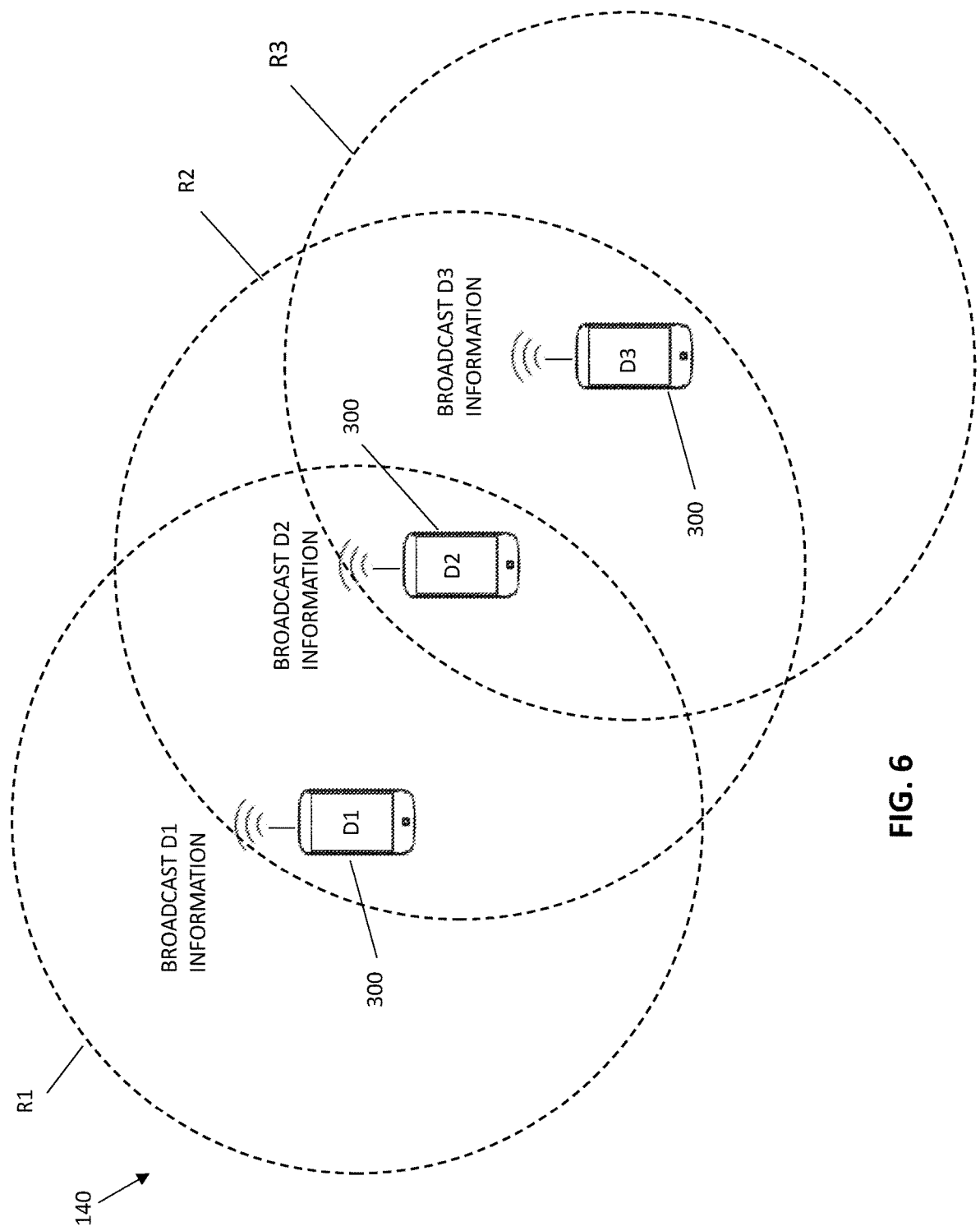
FIG. 6 is a diagram illustrating an example of devices activated in D2D mode.

FIG. 6 is a diagram illustrating a plurality of devices 300 configured for initial device information broadcasting in D2D mode, according to an embodiment. In an embodiment, devices D1, D2, D3 are configured to broadcast initial device information when activated to D2D mode. The initial device information may be the device information of the broadcasting device. For example, D1 may broadcast D1 device information. The device information is broadcast over a range of the broadcasting device, and may be received by another active D2D device 300 within that range. For example, D1 device information may be broadcast by D1 over a range R1. The D1 device information may be received directly by D2, positioned in range R1. D2 device information broadcast by D2 may be received directly by D1 and D3, both of which are positioned within range R2. D3 device information may be broadcast by D3 and received directly by D2 positioned in range R3.

With further reference to FIG. 6, D2 may be considered a visible device to D1, D1 and D3 may be considered visible devices to D2, and D2 may also be considered a visible device to D3. D3 may be considered a non-visible device to D1, and D1 may be considered a non-visible device to D3.

Figure 7:
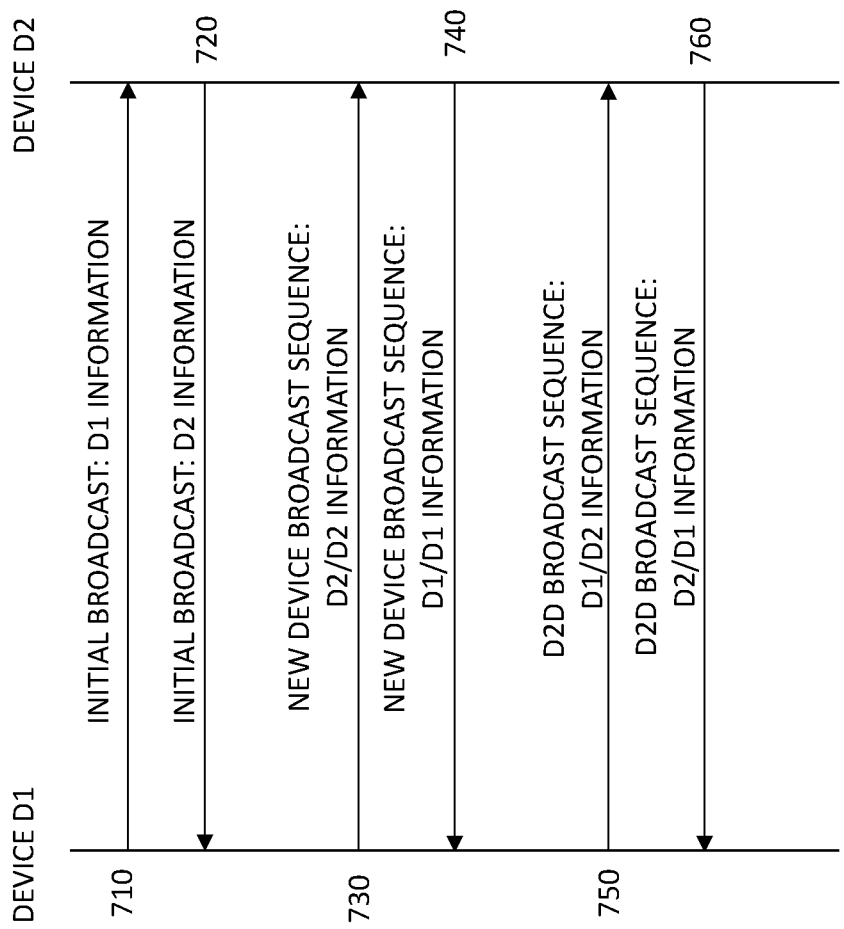
FIG. 7 is a diagram illustrating an example of two devices broadcasting in D2D mode.

FIG. 7 is a diagram illustrating an example of two devices D1, D2 broadcasting device information in D2D mode. In an embodiment, D1 is configured to initially broadcast D1 device information 710 and D2 is configured to initially broadcast D2 information 720. Devices 300 may initially broadcast their own device information, i.e., the initial device information, for example, upon activation to D2D mode.

A device 300 of the D2D virtual mesh network 140 may be configured to broadcast device information in a predetermined new device broadcast sequence when adding a new device to the D2D virtual mesh network 140. A new device may be added to the D2D virtual mesh network, for example, when a device 300 in the D2D virtual mesh network 140 receives device information (i.e., initial device information) broadcast from the new device for the first time. For example, in response to receiving D2 device information for the first time, D1 may broadcast the D2 device information according to a new device broadcast sequence. In an embodiment, D1 may broadcast the D2 device information twice, consecutively 730, in accordance with the new device broadcast sequence. Similarly, in response to receiving D1 information for the first time, D2 may broadcast D1 device information twice, consecutively 740.

After the initial broadcast and new device broadcast sequence, a device 300 of the D2D virtual mesh network 140 may be configured to broadcast its own device information and device information of other devices in the D2D virtual mesh network 140 according to a D2D broadcast sequence. In an embodiment, the D2D broadcast sequence may be based on one or more components of the device information. For example, the D2D broadcast sequence may be based on battery information and proximity information. In an embodiment, the D2D broadcast sequence may first broadcast device information of non-visible devices and then device information of visible devices. Further, in an embodiment, the device information of the visible devices may be broadcast in either an ascending or descending order based on the battery TTL. Similarly, in an embodiment, the device information of the non-visible devices may be broadcast in either an ascending or descending order based on the battery TTL. Further still, in an embodiment, the D2D broadcast sequence may provide that the device information of the broadcasting device be included in every other broadcast.

Referring still to FIG. 7, D1 may broadcast device information according to the D2D broadcast sequence 750 as follows: D1/D2. D2 may broadcast device information according to the D2D broadcast sequence 760 as follows: D2/D1. Because there are only two devices in this example, further sequencing based on battery information or proximity information is not performed.

Figure 8:
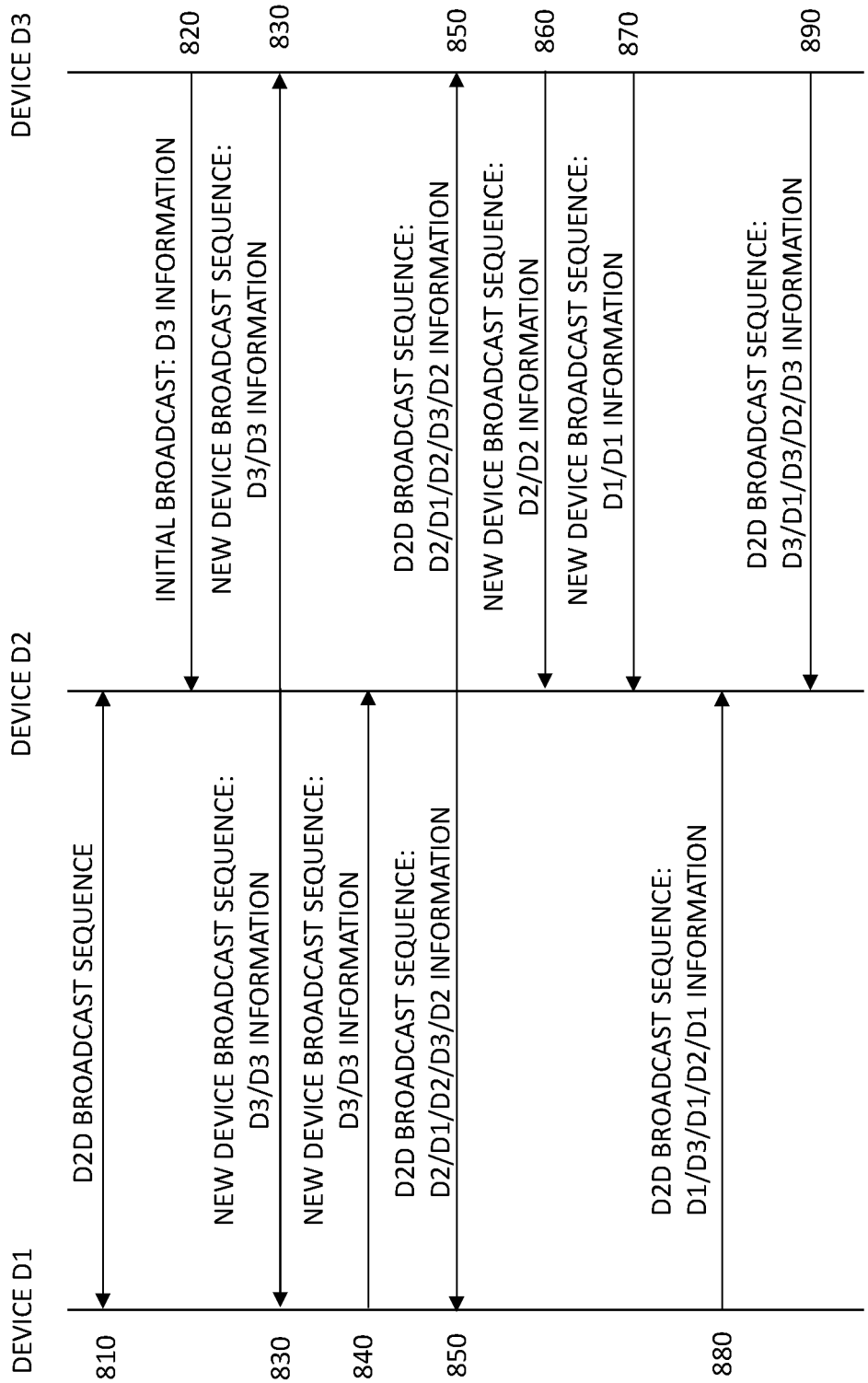
FIG. 8 is a diagram illustrating a new, third device broadcasting in D2D mode with respect to the two devices of FIG. 7, according to an embodiment.

FIG. 8 is a diagram illustrating an example of a new, third device D3 being added to the D2D virtual mesh network 140 including first and second devices D1, D2 of FIG. 7. In an embodiment, D2 may be visible to D3 and D1 may be non-visible to D3. At 810, D1 and D2 may broadcast device information according to the D2D broadcast sequence described above with respect to FIG. 7. At 820, new device D3, when activated, may initially broadcast its own information in a manner similar to D1 at 710 and D2 at 720. The initial broadcast D3 device information may be received directly by visible device D2. At 830, after receiving the initial broadcast D3 device information, D2 may broadcast D3 device information according to the new device broadcast sequence. For example, D2 may broadcast the D3 device information twice, consecutively (i.e., D3/D3). The new device broadcast sequence including the D3 device information may be received directly by active visible devices. For example, in an embodiment, the D3 device information may be received directly at D1 and D3 in the new device broadcast by D2. In this manner, D1 may indirectly receive the D3 device information from D3 via D2.

At 840, because D3 device information is new to D1, D1 may broadcast the D3 device information according to the new device broadcast sequence. For example, D1 may broadcast D3 device information twice, consecutively (i.e., D3/D3). The new device broadcast from D1 may be received directly at active visible devices, such as D2 in this example.

At 850, D2 may broadcast device information for logged, activated D2D virtual mesh network devices according to the D2D broadcast sequence. For example, as described above, the D2D broadcast sequence may prioritize broadcasting information for non-visible devices before visible devices and may order the information to be broadcast according to the battery information of each device. Thus, in an embodiment, D2 may broadcast device information in the following sequence: D2/D1/D2/D3/D2. In this example, D1 and D3 are both visible to D2, but D1 may have a shorter TTL than D3. Thus, D2 may prioritize D1 in the D2D broadcast sequence ahead of D3.

The device information included in the D2D broadcast sequence from D2 may be received directly by visible devices in the D2D virtual mesh network 140, in this example, D1 and D3. It is understood that this example is presented simply for illustrative purposes and is not limiting. For example, in the D2D virtual mesh network 140, there may be greater or fewer visible devices, the new device broadcast sequence may vary, and the D2D broadcast sequence may vary based on the number of logged devices (i.e., active devices in the D2D virtual network 140 for which device information has been received and stored), different device information and/or different prioritization of device information.

As described above. the broadcast of device information from D2 according to the D2D sequence includes device information for D1, D2 and D3. Because D3 has not previously received D1 or D2 device information, D1 and D2 are considered new devices by D3. Accordingly, D3 may broadcast the new device information according to the new device broadcast sequence. For example, at 860, D3 may broadcast D2 device information twice, consecutively (i.e., D2/D2), and at 870, D3 may broadcast D1 device information twice, consecutively (i.e., D1/D1). The new device information broadcasts from D3 may be received directly by active visible devices in the D2D virtual mesh network 140, such as D2 in this example.

At 880, D1 may broadcast the device information of devices in the D2D virtual mesh network 140 according to the D2D broadcast sequence. The device information may be device information of all logged devices at D1. For example, D1 may broadcast device information according to the D2D broadcast sequence as follows: D1/D3/D1/D2/D1. In this example, D3 may be prioritized ahead of D2 because D3 is a non-visible device to D1 and D2 is a visible device.

At 890, D3 may broadcast the device information of devices in the D2D virtual mesh network 140 according to the D2D broadcast sequence. The device information may be device information of all logged devices at D3. For example, D3 may broadcast device information according to the D2D broadcast sequence as follows: D3/D1/D3/D2/D3. In this example, D1 may be prioritized ahead of D2 because D1 is a non-visible device to D3 and D2 is a visible device.

It is understood that the examples above referring to devices D1, D2, D3 are provided for illustration and understanding of the concepts described herein, but that the present disclosure is not limited to use with only three devices 300. For instance, FIGS. 9-11 show non-limiting examples of a D2D virtual mesh network with 24 devices. It is envisioned that the number of devices in the D2D virtual mesh network 140 can be in the 10s, 100s or 1000s.

In an embodiment, the stored device information and/or broadcasting duration of a device 300 may be limited. For example, each device 300 may be configured to store device information of a predetermined number of devices 300 communicating in the D2D virtual mesh network 140. In this manner, a device 300 may save memory and limit an amount of device information to be broadcast. For example, when a device 300 stores device information of a number of devices 300 below the predetermined maximum number, the device 300 may continue to broadcast device information according to the broadcast sequence. However, if a number of devices for which device information is stored is equal to or exceeds the predetermined maximum number of devices, then the device 300 may stop transmitting. In an embodiment, the device 300 may continue to receive device information from all incoming broadcasts.

Accordingly, in an embodiment, a plurality of devices 300 in a geographic area may form a dynamic D2D virtual mesh network in which each device 300 may store its own device information as well the device information of other devices 300 in its vicinity up to the predetermined number of devices thereby forming a sub-D2D virtual mesh network. A device 300 in such a dynamic D2D virtual mesh network does not necessarily contain device information of all devices 300 in the entire D2D virtual mesh network 140. In an embodiment, the D2D virtual mesh network 140 may include a plurality of sub-D2D virtual mesh networks.

A device 300 in the dynamic D2D virtual mesh network may continue to receive broadcasts from other devices 300 even after the device 300 has stopped transmitting due to the maximum predetermined number of devices being reached. Accordingly, the device 300 may receive pings. In an embodiment, such a non-transmitting device 300 may start transmitting the device information in response to receiving a ping. In this manner, the device information may be provided to, for example, a mobile information collection device 150.

FIG. 9 is a table showing visible devices and non-visible devices in an example of a D2D virtual mesh network including 24 devices 300 (devices 1-24). FIG. 10 is a table showing examples of battery information including TTL and SoH for the devices in a D2D virtual mesh network, in descending order according to TTL. FIG. 11 is table showing an example of the D2D broadcast sequence in a D2D virtual mesh network. In the example of FIG. 11, the D2D broadcast sequence may be determined by first broadcasting non-visible device information in ascending order based on TTL, and then broadcasting visible device information in ascending order based on TTL. It is understood, however, that the D2D broadcast sequence can be based on other device information and ordered differently (e.g., descending or ascending).

In an embodiment, each device 300 of the D2D virtual mesh network 140 includes device information log(s) stored, for example, in the storage component 230. The stored device information may include, for example, device information of a plurality of devices 300 in the D2D virtual mesh network 140. In this manner, device information is made redundant across the devices 300 of the D2D virtual mesh network 140. That is, each device 300 of the D2D virtual mesh network may store device information of other devices, as well as its own device information, in the device information log(s). Each device 300 may also broadcast its own device information as well as the device information of each other device in the D2D virtual mesh network 140. In an embodiment, the device information may include device information of each device 300 communicating in the D2D virtual mesh network 140. In another embodiment, the device information may include device information of a subset of devices 300 communicating in the D2D virtual mesh network 140.

In an embodiment, if a device 300 of the D2D virtual mesh network 140 does not have sufficient battery power to obtain a GPS fix, previously logged location information may remain in the device information logs. In an embodiment, authentication of geodetic coordinates may be performed on devices (receiver nodes) with functioning GPS capabilities.

In an embodiment, the device 300 is configured to be deactivated from the D2D mode, for example, in response to receiving mode information indicating that the D2D mode is to be deactivated. The mode information for deactivating the D2D mode at the device 300 may be received according to any of the techniques above for receiving the mode information for activating the D2D mode. Alternatively, or in addition, the D2D mode may be deactivated by powering off or restarting the device. In such an embodiment, mode information for deactivating the device 300 may be included in, for example, a shut down or start up sequence executed by the processor 210.

The device 300, in response to receiving mode information for deactivating the D2D mode, may delete all device information acquired while operating in D2D mode. For example, the device 300 may delete the device information of the other D2D virtual mesh network devices in response to deactivating the D2D mode. In an embodiment, a user of the device 300 may provide an instruction to the device 300, for example via the input component 240, to delete the device information of that device and/or device information of other D2D virtual mesh network devices stored at the device 300.

Figure 12:
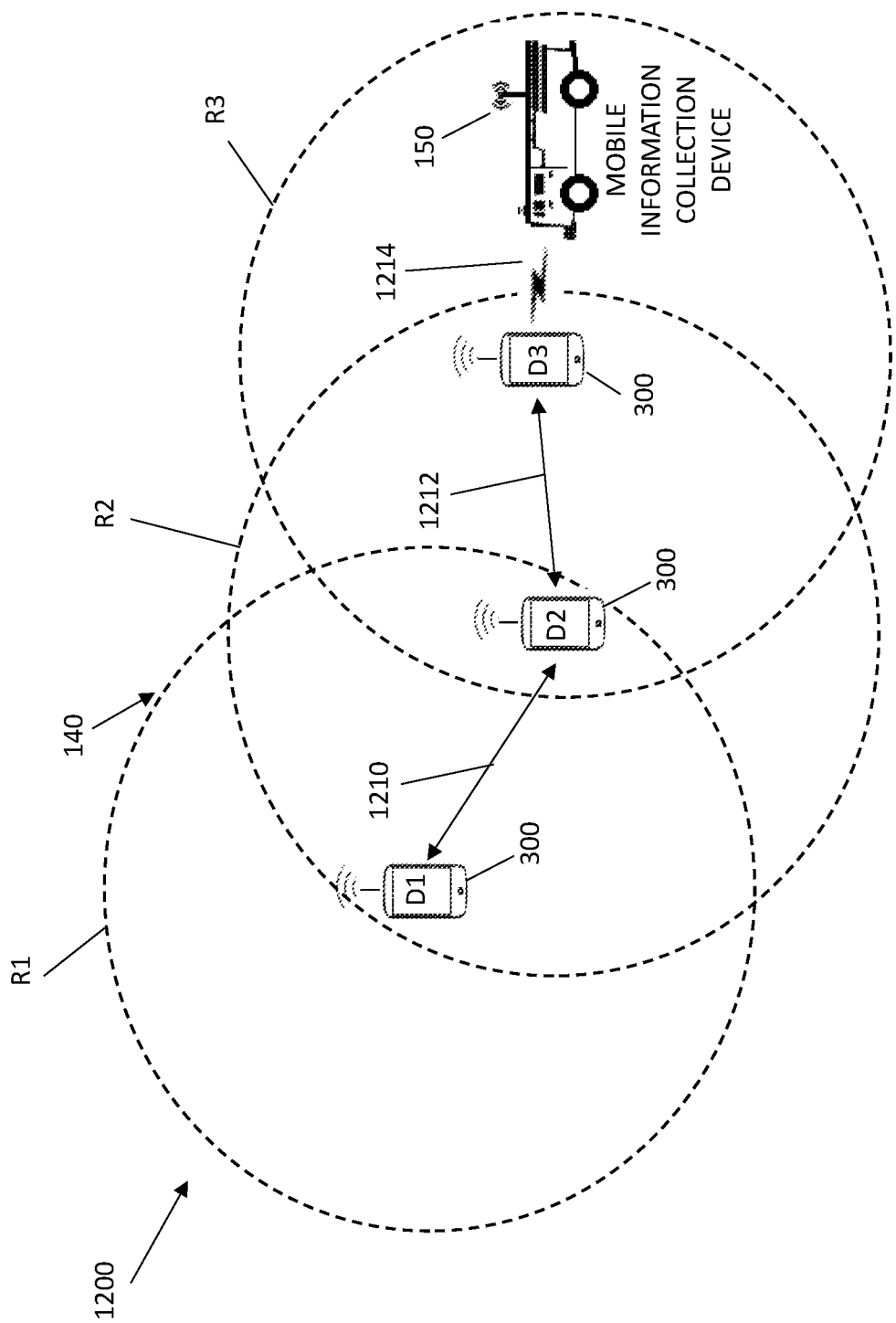
FIG. 12 is a diagram illustrating an example of a D2D communication system according to an embodiment.

FIG. 12 is a diagram illustrating an example of a D2D communication system 1200 according to an embodiment. The D2D communication system 1200 may include a plurality of devices 300, such as devices D1, D2, D3 shown in FIG. 12. Each device D1, D2, D3 may be configured to broadcast device information over a respective range R1, R2, R3. The device 300 may broadcast initial device information when D2D mode is activated. The initial device information may be the device information of the broadcasting device, in which the proximity information of other devices may be omitted. The device 300 may broadcast the initial device information according to an initial broadcast sequence. The initial broadcast sequence may set one or more time intervals between broadcasts of the initial device information.

The device 300 may also broadcast device information according to a new device broadcast sequence. In an embodiment, in the new device broadcast sequence, the device 300, in response to receiving device information from a new device, may interrupt any ongoing broadcast sequence to broadcast the device information of the new device in two consecutive broadcasts. It is understood that the present disclosure is not limited to such a new device broadcast sequence, however, and that in some embodiments, other new device broadcast sequences which may vary in content and/or sequence from any ongoing broadcast sequence may be utilized. In an embodiment, the device information received from a new device may be device information included in an initial broadcast of the new device in response to activation of D2D mode.

The device 300 may also broadcast device information according to a D2D broadcast sequence. The D2D broadcast sequence, as described above, may be determined based on the device information of devices 300 in the D2D virtual mesh network 140. For example, in an embodiment, the D2D broadcast sequence may be determined based on proximity information and battery information included in the device information of the D2D virtual mesh network devices 300. The D2D broadcast sequence may be an ongoing broadcast sequence which can be interrupted when a device information of a new device is received at the device 300. In an embodiment, the device 300 may receive device information of a new device in the D2D virtual mesh network 140 in the D2D broadcast sequence, for example, when the new device is a non-visible device. Accordingly, the device 300 may broadcast the device information of the new device according the new device broadcast sequence in response to receiving the new device information in the D2D broadcast sequence.

The D2D broadcast sequence may also be updated based on changes in the device information of the D2D virtual mesh network devices 300. For example, if one device 300 of the D2D virtual mesh network devices has a battery TLL which decreases to fall below the battery TLL of another D2D virtual mesh network device, the device 300 may update the D2D broadcast sequence to reflect the change in battery TLL of the one device relative to the other. In an embodiment, the device information received at the device 300 may be analyzed by the processor 210 based on sequence instructions, and the processer 210 may determine the D2D broadcast sequence accordingly.

The system 1200 may also include a mobile information collection device 150 as described above. The mobile information collection device 150 may be, for example, a base station, an access point, a server, or another device 300, configured for communication with at least one device 300 of the D2D virtual mesh network 140. The mobile information collection device 150 may be positioned with a vehicle, such as a first responder vehicle, including but not limited to, a firetruck, a police car, an ambulance, an aircraft (e.g., plane, helicopter, UAV and the like), or other government or private vehicle used for first responder and/or emergency services. In an embodiment, the mobile information collection device 150 may carried by a person, such as a first responder. The present disclosure is not limited to these examples, however. For instance, it is envisioned that the mobile information collection device 150 may be used in a system for non-emergency purposes, for example, at a worksite or event where it may be desirable to collect and monitor device information of a plurality of devices in a D2D virtual mesh network.

The mobile communication collection device 150 may be configured for D2D communication with at least one device 300 of the D2D virtual mesh network. Thus, when the mobile information collection device 150 is within range of at least one device 300 of the D2D virtual mesh network 140, the mobile information collection device 150 may receive device information broadcast from the at least one device 300. For example, in FIG. 12, the mobile information collection device 150 may receive device information broadcast by D3 when positioned in range R3 of D3. Because device information for all devices in the D2D virtual mesh network is broadcast by and stored at each device, the mobile information collection device 150 may receive device information of all devices 300 in the D2D virtual mesh network, including devices 300 having ranges in which the mobile information collection device 150 is not positioned.

In an embodiment, the mobile information collection device 150 may also broadcast certain information, such as text messages, notifications and the like to the at least one other device 300 of the D2D virtual mesh network 140, which may then be broadcast to the other devices 300 of the D2D virtual mesh network 140.

Although it is envisioned that the mobile information collection device 150 may receive device information using a suitable D2D communication technology, standard and/or protocol, such as BLE, other communication technologies, standards or protocols are envisioned as well. For example, the mobile information collection device 150 may be a mobile cellular base station, and may establish a cellular connection with at least one device 300 of the D2D virtual mesh network and receive the device information via the cellular connection.

Referring still to FIG. 12, double arrow 1210 indicates a flow of device information between visible devices D1, D2. Double arrow 1212 indicates a flow of device information between visible devices D2, D3. Connection 1214 indicates a connection between a device 300, such as D3, and the mobile information collection device 150. Device information may be communicated between non-visible devices, such as D1, D3, through an intermediate device, such as D2, for instance, by way of 1210 and 1212.

In an embodiment, if a device 300 is provided a cellular communication channel, it may generate SMS of the device information, for example, a tabular form of the device information logs, and transmit the SMS to an embedded emergency number provided by the D2D virtual mesh network. The tabular data may be subdivided into short SMSs depending on size. The device receiving the tabular data via the emergency number may transmit a receipt confirmation message to the device transmitting the tabular data.

The mobile information collection device 150 may be used to determine a location of each device 300 in the D2D virtual mesh network based on the received device information logs. For example, the mobile information collection device 150 may retrieve current or previous GPS coordinates from the device information logs and/or estimated location or proximity information of a device 300. In this manner, personnel authorized to access the device information logs received by the mobile information collection device 150 may ascertain the position or estimated position of each of the devices 300 and allocate physical resources to those locations as appropriate. For example, in an emergency or disaster scenario, an agency may access the device information logs provided by a device 300 of the D2D virtual mesh network to the mobile information collection device 150, ascertain the position or an estimated position of the devices for which device information is provided, and direct first responders to the device locations indicated by the device information logs.

Figure 13:
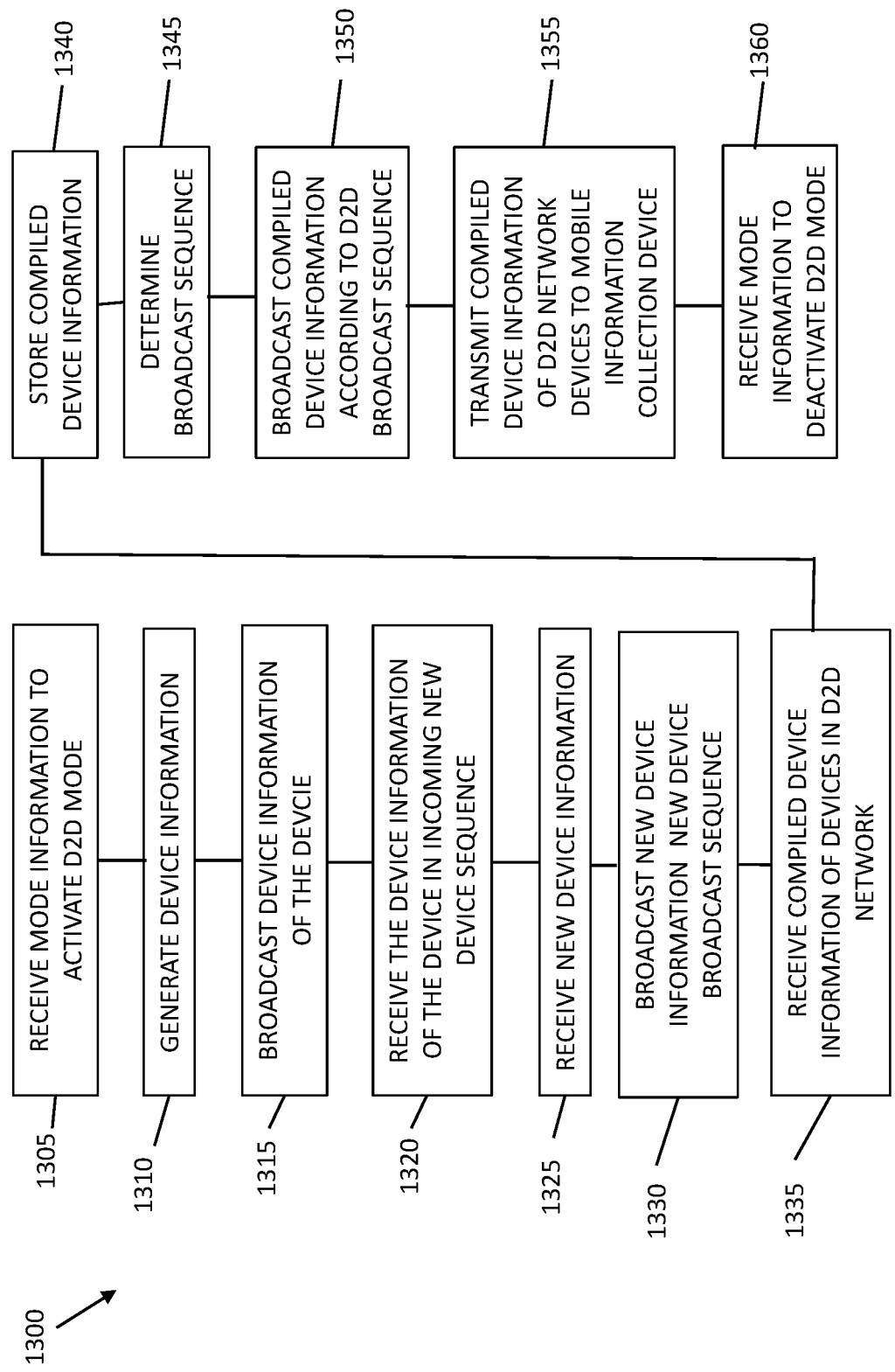
FIG. 13 is a block diagram illustrating an example of a D2D communication method at a device, according to an embodiment.

FIG. 13 is a block diagram illustrating an example of a D2D communication method 1300 at a device 300, according to an embodiment. At 1305, the device 300 may receive mode information to activate the D2D mode of the device 300. The mode information may be received at the processor 210, for example, via the input component 240 or the communication interface 260. The processor 210 may interpret the mode information, determine that D2D mode is to be activated, check for D2D permissions in the storage component 230, and activate D2D mode. For clarity in the following examples, the device 300 may also be referred to as a first device 300, and the device information of the first device 300 may be referred to as first device information. Similarly, other devices 300 communicating in the D2D virtual mesh network 140 may be referred to as a second device, a third device, and so on, while device information of such other devices may be referred to as second device information, third device information, and so on, respectively. The first, second and third devices 300 may correspond to devices D1, D2, D3 in the examples above.

At 1310, the device 300, e.g., the first device, may generate its own device information, e.g., first device information. The first device information may be initial first device information. To generate first device information, the processor 210 may retrieve from the storage component 230 and/or system memory 220, device ID information, battery information, proximity information and location information. The device ID information may be a phone number or other unique identifier associated with the device 300. The battery information may include TLL and/or SoH information. The proximity information may include a number and/or ID of visible and non-visible devices in the D2D virtual mesh network. The location information may include GPS coordinates, geodetic information, and/or estimates of the same. In an embodiment, the processor 210 may generate the device information as one or more broadcast packets. In an embodiment, the device information may be generated in response to activating D2D mode. Device information generated in response to activating D2D mode may be considered initial device information of the first device 300.

At 1315, the device 300, e.g., the first device, may broadcast device information, i.e., the first device information. The initial device information, e.g., the initial first device information, may omit the proximity information because device information from other devices may not have been received by the first device 300 before the initial broadcast. The initial broadcast may be initiated by the processor 210 controlling the communication interface 260 to broadcast the initial device information at predetermined time intervals, i.e., according to an initial broadcast sequence. In an embodiment, broadcasting first device information may include broadcasting first device information of the first device 300 at periodic time intervals using D2D communication.

At 1320, the device 300, e.g., the first device, may receive the first device information in an incoming new device broadcast sequence from another device, e.g., a second device, communicating in the D2D virtual mesh network 140. For example, after broadcasting its own device information, the device 300, e.g., the first device 300, may receive its own device information in a broadcast from another device, e.g., the second device, in the D2D virtual mesh network 140 as part of a new device broadcast sequence. The other device 300, e.g., the second device, may broadcast the first device information in the new device broadcast sequence in response to receiving the first device information of the first device 300 and determining the first device information is new device information, i.e., information associated with a new device in the D2D virtual mesh network 140.

At 1325, the device 300, e.g., the first device, may optionally receive new device information from one or more other devices joining the D2D virtual mesh network 140 and/or one or more other existing devices communicating in the D2D virtual mesh network 140 from which the first device 300 has not yet received device information. For example, another device, such as a third device, activated to operate in D2D mode may broadcast its device information or initial device information, e.g., the third device information or initial third device information, which may be received by the device 300, e.g., the first device, for instance, via the input component 240 and/or communication interface 260. The device 300, e.g., the first device, may store the received new device information, e.g., the third device information, at the storage component 230. In an embodiment, the received new device information, e.g., the third device information, may be stored in one or more device information storage logs of the device 300, e.g., the first device. The processor 210 may identify the received device information, e.g., the third device information, as being new device information for example, by comparing device ID information of the received device information to the device ID of stored device information. If the device ID information of the received device information does not match stored device ID information, then the processor 210 determines that the received device information, e.g., the third device information, is new device information. Alternatively, or in addition, the device 300, e.g., the first device, may determine the received device information, e.g., the third device information, as being new device information by analyzing the contents of the received device information for particular information or omission of particular information, such as proximity information.

At 1330, in response to receiving new device information, the device 300, e.g., the first device, via the communication interface 260 and/or output component 250, controlled by the processor 210, may optionally broadcast a new device broadcast sequence. In an embodiment, the new device broadcast sequence may include broadcasting the new device information, e.g., the third device information, of the new device, e.g., the third device, two or more times consecutively.

At 1335, the device 300, e.g., the first device 300, may receive device information of devices in the D2D virtual mesh network 140. The device information may be received directly from a visible device in the D2D virtual mesh network 140. The device information may be collected or compiled device information and may include device information for all or some devices, visible and non-visible, communicating in the D2D virtual mesh network 140. For example, the device information may include first device information, second device information and third device information of first, second and third devices, respectively, in the D2D virtual mesh network 140. Thus, the collected or compiled device information of devices in the D2D virtual mesh network 140 received by the device 300, e.g., the first device, may include device information of the first device 300 that had been previously transmitted by the first device 300 and stored at other devices, e.g., the second device and/or the third device. The device information of the devices in the D2D virtual mesh network 140 may be received, for example, via the input component 240 and/or communication interface 260 and may be stored in the storage component 230 of device 300, e.g., the first device. In an embodiment, the device information logs of the device 300, e.g., the first device, may be updated to include the most recently received device information of the devices in the D2D virtual mesh network 140.

In an embodiment, the device information of the devices in the D2D virtual mesh network 140 may be received by the device 300, e.g., the first device, in an incoming D2D broadcast sequence. The device information may include device information of respective devices of a plurality of devices communicating using D2D communication, and thus, may include device information of devices in the D2D virtual mesh network 140 or a D2D virtual sub-mesh of the D2D virtual mesh network. The plurality of devices may include the device 300, e.g., the first device 300, and one or more additional devices, e.g., the second device 300 and/or the third device 300. The one or more additional devices may include devices activated to operate in D2D mode and/or devices communicating in the D2D virtual mesh network 140. Accordingly, the device information received by the device 300 in the incoming D2D broadcast sequence may be compiled device information for the plurality of devices communicating in the D2D virtual mesh network 140 or D2D virtual sub-mesh.

At 1340, the device information may be stored, for example, in a device information log of the device 300, e.g., the first device. At 1345, the device 300, e.g., the first device, may determine a broadcast sequence of the stored device information, which may include the compiled device information of a plurality of devices in the D2D virtual mesh network 140. For example, the device 300, e.g., the first device, may receive device information for a plurality of devices in the D2D virtual mesh network 140 and store the device information in the one or more device information logs, for example, at the storage component 230. To determine a broadcast sequence, the processor 210 may analyze the stored device information and establish a priority (or sequence) based on one or more predetermined sequence factors. For example, in an embodiment, a D2D broadcast sequence may be determined based on the proximity information and the battery information for the devices in the D2D virtual mesh network 140 having device information stored at the device 300, e.g., the first device. In addition, the D2D broadcast sequence may provide that the device information of the broadcasting device, i.e., device 300, is broadcast at periodic intervals. For example, in an embodiment, the device information of the broadcasting device 300 may be included in every other broadcast, while the device information of the other devices in the D2D virtual mesh network 140 is broadcast in a sequence based on the proximity information and battery information for each device.

In an embodiment, the processor 210 may determine the D2D broadcast sequence by ordering device information for non-visible devices to be broadcast before device information for visible devices. In addition, in an embodiment, the processor 210 may determine the D2D broadcast sequence by ordering the device information in one of an ascending or descending order based on the battery information, such as TLL, for each device. In an embodiment, determining the D2D broadcast sequence includes sequencing the non-visible devices based on the battery information of the non-visible devices and sequencing the visible devices based on the battery information of the visible devices. The device 300, e.g., the first device, may update the D2D broadcast sequence when device information is received which changes the order of one device relative to the others, for example, with respect to the battery information.

At 1350, the device 300, e.g., the first device, may broadcast the device information of the devices in the D2D virtual mesh network 140 according to the D2D broadcast sequence. For example, the device 300 may broadcast the compiled device information according to the determined D2D broadcast sequence. In this manner, the device information of the plurality of devices in the D2D virtual mesh network 140 stored at the device 300, e.g., the first device, may be broadcast to the other devices of the D2D virtual mesh network 140. Accordingly, updated device information for a device in the D2D virtual mesh network and/or device information for a new device in the D2D virtual mesh network, may be disseminated to the other devices of the D2D virtual mesh network 140.

At 1355, the device 300, e.g., the first device, may transmit the device information of the D2D virtual mesh network devices, i.e., the plurality of devices, to a mobile information collection device 150. For example, the device 300 may transmit the compiled device information. In an embodiment, the device information logs in which the compiled device information is stored may be transmitted to the mobile information collection device 150. Alternatively, or addition, the device 300 may transmit the device information to the mobile information collection device according to the D2D broadcast sequence. In an embodiment, the device 300 may transmit the device information of the D2D virtual mesh network devices in response to a request received from the mobile information collection device 150, for example, when the device 300 is detected by the mobile information collection device 150 and/or when the device 300 connects to the mobile information collection device 150.

At 1360, the device 300 may receive mode information to deactivate the D2D mode. In an embodiment, the device 300 may delete the device information in response to receiving the mode information to deactivate the D2D mode or restarting or powering down the device 300.

In some embodiments, the device 300 may receive device information directly from a new device joining the D2D virtual mesh network 140, for example, in response to the new device broadcasting its initial device information. For example, such new device information may be received directly by the device 300 if the new device is a visible device. Alternatively, or in addition, the device 300 may receive device information of a new device in a D2D broadcast sequence in which the compiled device information is received. For example, the new device information may be included in the compiled device information of a D2D broadcast sequence. In this manner, device information of a new device may be received by the device 300 when a new device is activated that is visible or not visible to the device 300.

It is understood that the determination of whether or not a device is a new device may be determined on a device-by-device basis. Thus, one device, e.g., a first device, may consider another device, e.g., a second device to be a new device, while yet another device, e.g., a third device, may not consider the second device to be a new device. For example, a device 300, e.g., a first device, may be activated to operate in D2D mode to join an existing D2D virtual mesh network 140 including second and third devices. The first device may determine the second and third devices to be new devices. The second and third devices may determine the first device to be a new device. However, the second and third devices may not determine one another to be new devices, even though the first device does.

Thus, in an embodiment, a device 300, e.g., a first device, may consider another device, e.g., a second device, to be a new device when the device 300, e.g., the first device, does not have device information of the other device, e.g., the second device, stored in the device information logs. Accordingly, a device 300 newly activated to operate in D2D mode to join the D2D virtual mesh network 140 may be determined by existing devices in the D2D virtual mesh network 140 to be a new device. In addition, existing devices 300 in a D2D virtual mesh network 140 may be determined by another device, such as a device joining the D2D virtual mesh network 140, to be new devices.

In an embodiment, the method may further include determining whether the compiled device information, received from a device of the plurality of devices, includes device information of a new device in the D2D virtual mesh network 140. The method may include, in response to determining the compiled device information includes new device information, determining that the broadcast sequence is a new device broadcast sequence. The method may then include broadcasting, by the device, the new device information (i.e., device information of a new device communicating in the D2D virtual mesh network), the new device information according to the new device broadcast sequence.

In an embodiment, in response to determining that the compiled device information does not include new device information, the device 300 may determine the broadcast sequence to be a D2D broadcast sequence and broadcast the compiled device information according the D2D broadcast sequence.

In an embodiment, the method may include determining a D2D broadcast sequence of the compiled device information based on the compiled device information stored at the device 300. For example, the device 300 may receive the compiled device information from another device communicating in the D2D virtual mesh network 140. If the device information of any of the plurality devices has changed, the device 300 may determine an updated D2D broadcast sequence reflecting the change, and then broadcast the compiled device information according to the updated D2D broadcast sequence.

The device 300 may be configured to receive the device information of the plurality of devices, i.e., the compiled device information, as a function of time. In this manner, the device 300 may receive updated, i.e., more recent, device information for the devices of the plurality of devices. Accordingly, the method may further include receiving, by the device 300, updated compiled device information in an updated incoming D2D broadcast sequence. The device 300 may store the updated compiled device information, for example, in updated information logs. The updated information logs may be updated versions of existing information logs in which previous information is replaced with updated information. Alternatively, or in addition, the updated information logs may be newly created information logs. The newly created information logs may be identified as containing the most recently received device information, for example, by way of a time stamp, label, title, numbering, or other information distinguishing the newly created information logs from prior information logs. In addition, or alternatively, the compiled device information may be indexed or otherwise organized with respect to time such that the most recent device information for the devices may be identified. For example, the compiled device information may be time stamped by the device 300 upon receipt, by one of the other devices upon broadcasting, or both.

As referenced above, the method may also include determining an updated D2D broadcast sequence, by the device 300, based on the updated compiled device information. The device 300 may broadcast the updated compiled device information according to the updated D2D broadcast sequence.

In some embodiments, the determining the broadcast sequence may include determining a D2D broadcast sequence based on one or more of the proximity information and the battery information included in the compiled device information.

Figure 14:
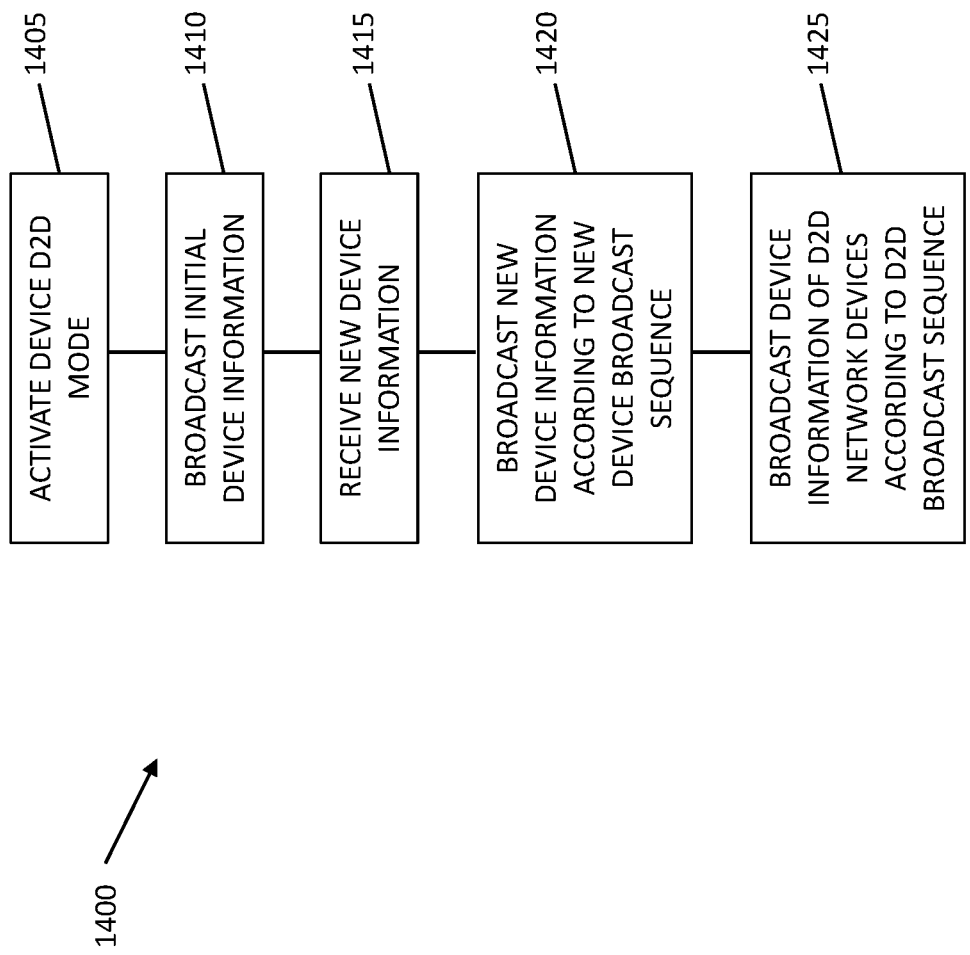
FIG. 14 is a block diagram illustrating an example of a method for setting up a D2D virtual mesh network at a first device, according to an embodiment.

FIG. 14 is a block diagram illustrating an example of method 1400 for setting up a D2D virtual mesh network at a first device D1. In an embodiment, at 1405, a first device D1 may be activated to D2D mode. At 1410 the first device D1 may broadcast initial D1 device information. The first device D1 may broadcast the initial D1 device information over a first range R1. The first device D1 may continue to broadcast the initial D1 device information if no other devices in D2D mode are within the first range R1.

At 1415, the first device D1 may receive new device information from a newly activated device in the D2D virtual mesh network. In response to receiving the new device information, at 1420, the first device D1 may broadcast the new device information according to a new device broadcast sequence. For example, the first device may broadcast the new device information in two consecutive broadcasts. At 1425, the first device D1 may broadcast device information for a plurality of devices in the D2D virtual mesh network 140 according to a D2D broadcast sequence.

Figure 15:
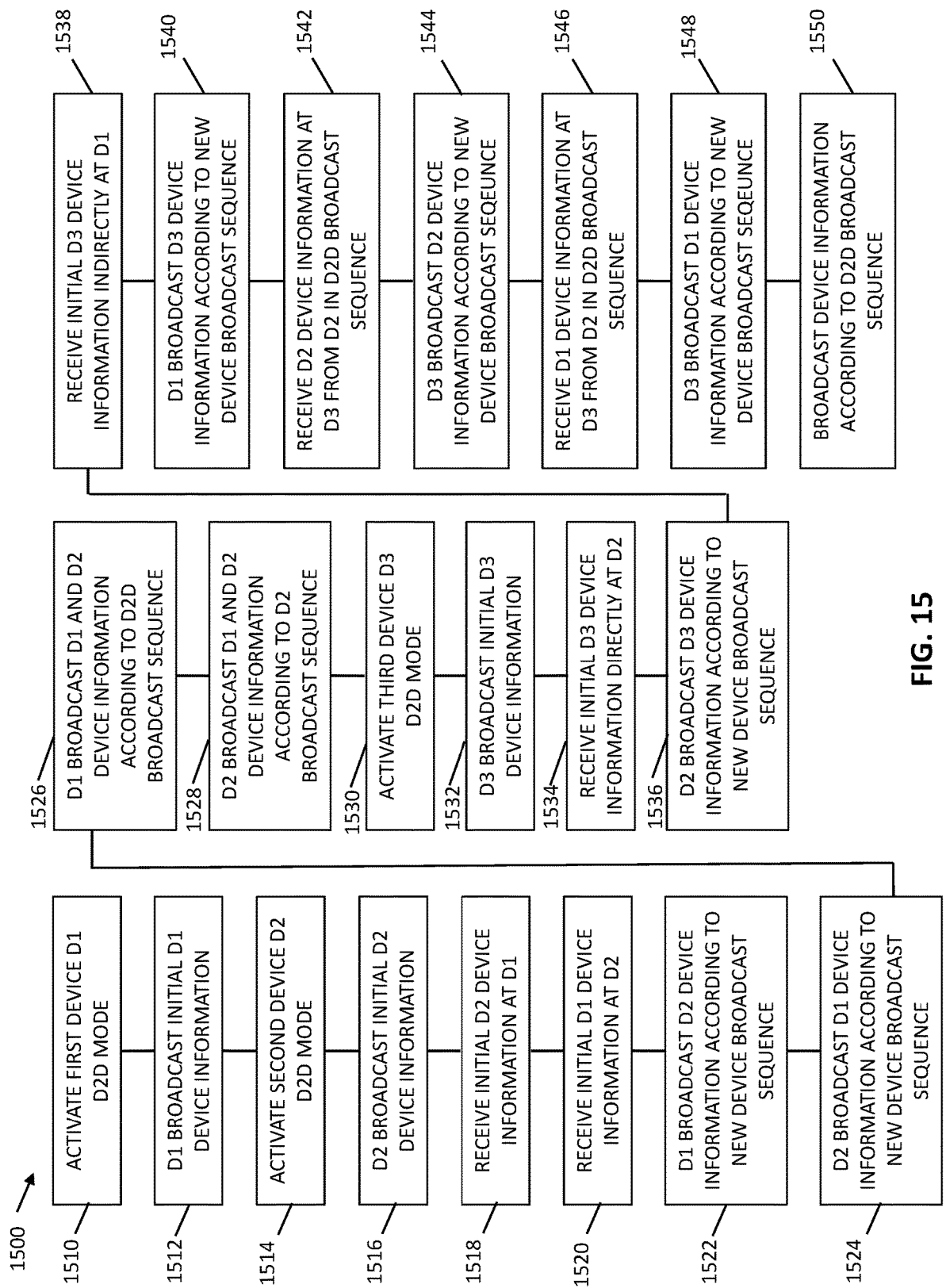
FIG. 15 is a block diagram illustrating an example of a method for setting up a D2D virtual mesh network at multiple devices, according to an embodiment.

FIG. 15 is a block diagram illustrating an example of method 1500 of setting up a D2D virtual mesh network. In an embodiment, at 1510, a first device D1 may be activated to operate in D2D mode. At 1512 the first device D1 may broadcast initial D1 device information. The first device D1 may broadcast the initial D1 device information over a first range R1. The first device D1 may continue to broadcast the initial D1 device information if no other devices operating in D2D mode are within the first range R1 of the first device D1.

At 1514, a second device D2 may be activated to operate in D2D mode. At 1516, the second device D2 may broadcast initial D2 device information. The second device D2 may broadcast the initial D2 device information over a second range R2. The second device D2 may continue to broadcast the initial D2 device information if no other devices in D2D mode are within the second range R2 of the second device D2.

If first device D1 is within second range R2 of the second device D2, and/or the second device D2 is within first range R1 of the first device D1, the initial device information broadcast by one of the devices D1, D2 may be directly received at the other of the devices D1, D2. For example, if first device D1 is within second range R2, then at 1518, the first device D1 may receive the initial D2 device information broadcast by D2. Similarly, if second device D2 is within first range R1, then at 1520, the second device D2 may receive the initial D1 device information broadcast by D1.

In response to receiving the initial D2 device information, the first device D1 may store the initial D2 device information and may identify the second device D2 as a new device in the D2D virtual mesh network. Further, in response to identifying the second device D2 as a new device, at 1522, the first device D1 may broadcast D2 device information according to a new device broadcast sequence. For example, the first device D1 may broadcast D2 device information in two consecutive broadcasts.

Similarly, in response to receiving the initial D1 device information, the second device D2 may store the initial D1 device information and may identify the first device D1 as a new device in the D2D virtual mesh network. Further, in response to identifying the first device D1 as a new device, at 1524, the second device D2 may broadcast D1 device information according to a new device broadcast sequence.

For example, the second device D2 may broadcast D1 device information in two consecutive broadcasts.

After the new device broadcast sequence, each device D1, D2 may broadcast D2D virtual mesh network device information according to a D2D virtual mesh network broadcast sequence. The D2D virtual mesh network device information may be device information of logged devices at each device D1, D2, i.e., device information received at the device from other devices, as well locally stored information of the device itself. For example, in an embodiment, the D2D virtual mesh network device information may include device information for a plurality of devices D1, D2 . . . Di in the D2D virtual mesh network. For example, at 1526, first device D1 may broadcast D1 device information and D2 device information according to the D2D virtual mesh network broadcast sequence. Similarly, at 1528, second device D2 may broadcast D2 device information and D1 device information according to the D2D virtual mesh network broadcast sequence.

Additional devices may be added to the D2D virtual mesh network 140. For example, at 1530, a new, third device D3 may be activated to operate in D2D mode. At 1532, the third device D3 may broadcast initial D3 device information. The third device D3 may broadcast the initial D3 device information over a third range R3. The third device D3 may continue to broadcast the initial D3 device information if no other devices in D2D mode are within the third range R3.

As an illustrative example, second device D2 may be within third range R3 and first device D1 may be outside of third range R3 but within second range R2. Thus, in such an example, second device D2 is a visible device relative to third device D3, and first device D1 is a non-visible device relative to D3. First device D1 is a visible device relative to second device D2. Accordingly, at 1534, the initial D3 device information may be received directly at visible, second device D2 and at 1536, the initial D3 broadcast by second device D2 according to the new device broadcast sequence. In this manner, at 1538, D3 device information may be indirectly received at first device D1, via a separate broadcast by D2.

First device D1 may store the received D3 device information and update the device information logs in storage component 230 or system memory 220 accordingly. In an embodiment, first device D1 may update its own device information in response to receiving the initial D3 device information. For example, first device D1 may update the proximity information to include third device D3 as a non-visible device. First device D1, after receiving D3 device information and identifying D3 as a new device, may, at 1540, broadcast D3 device information according to the new device broadcast sequence.

Second device D2 may also broadcast device information of logged D2D virtual mesh network 140 devices according to a D2D broadcast sequence. For example, second device D2 may broadcast D1 device information, D2 device information, and D3 device information according to the D2D broadcast sequence. At 1542, third device D3 may receive the device information broadcast from second device D2 in the D2D broadcast sequence, including D2 device information. Third device D3 may identify D2 as a new device, and in response, at 1544, third device D3 may broadcast D2 device information according to the new device broadcast sequence.

At 1546, third device D3 may also receive the D1 device information in a broadcast from second device D2 according to the D2D broadcast sequence. Third device D3 may identify first device D1 as a new device, and in response, at 1548, may broadcast the D1 device information according the new broadcast sequence. Thus, by way of initial device broadcasts, new device broadcasts, and the D2D broadcast sequence, device information of active devices in the D2D virtual mesh network 140 may be received and logged (i.e., stored in information logs) by each of the other devices in the D2D virtual mesh network 140.

At 1550, the devices D1, D2, D3 may broadcast the logged device information according to the D2D broadcast sequence.

Thus, in embodiments herein, a device 300 may be activated to operate in D2D mode and broadcast its own, local device information in an initial broadcast or broadcasts. The device 300 may receive device information broadcast from another device. The received device information may be from an initial broadcast of a recently activated device, a new device broadcast according to the new device broadcast sequence, and/or a D2D broadcast according to the D2D broadcast sequence.

The initial broadcast may be received from a visible device and include the device information of that visible device. The new device broadcast may be received from a visible device and include device information of another device, either visible or non-visible. The D2D broadcast may be received from a visible device and include device information of all devices logged at the visible device, including, for example, previously logged device information of the receiving device 300, device information of the broadcasting (i.e., visible) device, and device information of other visible or non-visible devices.

The device 300 may receive new device information in the D2D broadcast. For example, a device may be logged at the broadcasting (visible) device which has not yet been logged at the device 300. The device 300 may identify new device information received in the D2D broadcast and broadcast the new device information according to the new device broadcast sequence. The device 300 may also broadcast device information of devices logged at the device 300 according to the D2D broadcast sequence. In embodiments, device information, including new device information, initial device information and device information in the D2D broadcasts, may be broadcast in beacon advertisements.

Figure 16:
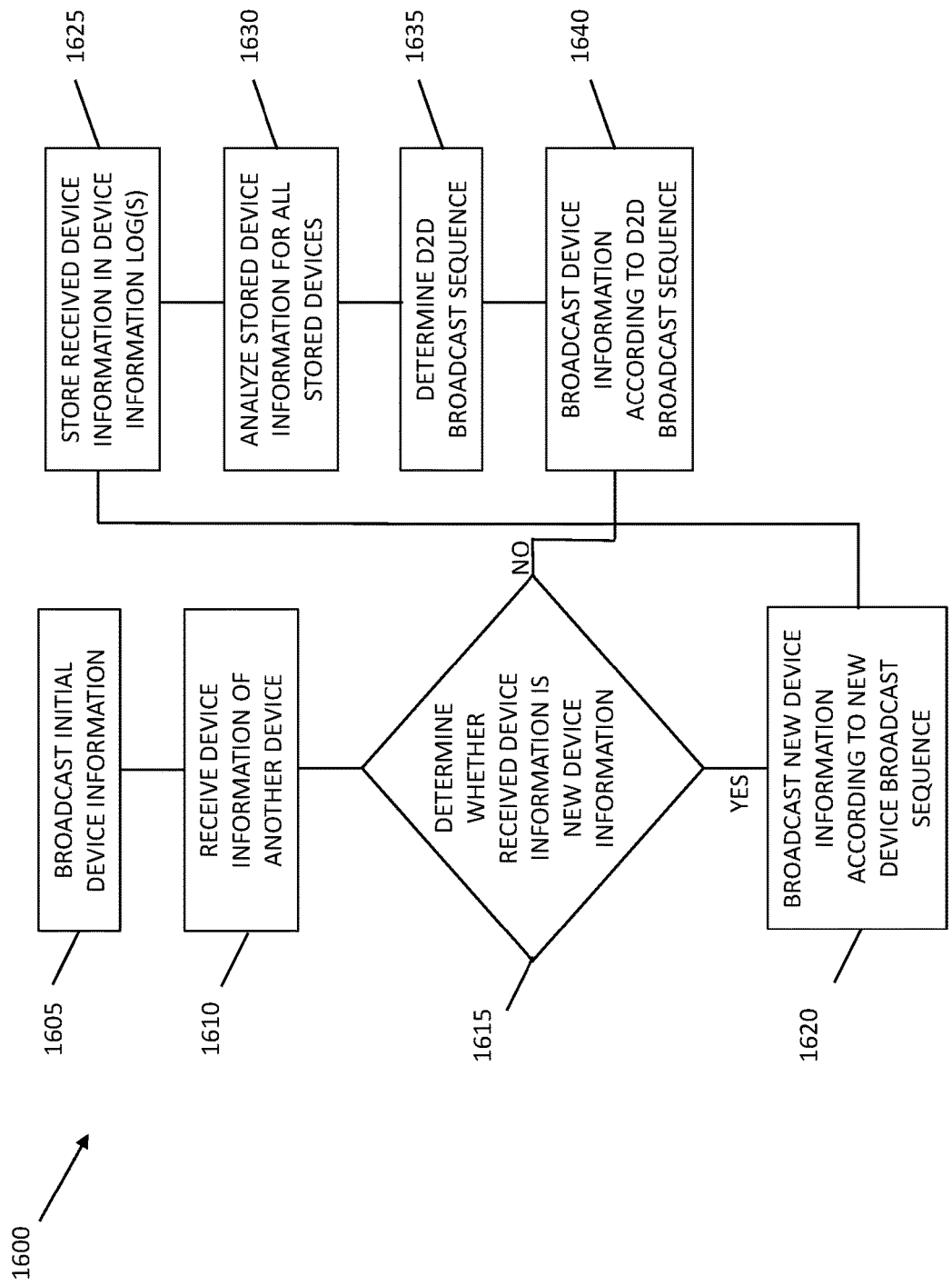
FIG. 16 is a block diagram illustrating an example of a method for determining a broadcast sequence of device information for devices in a D2D virtual mesh network, according to an embodiment.

FIG. 16 is a block diagram illustrating an example of a method 1600 for determining a broadcast sequence of device information. At 1605, a device 300 may broadcast its own information, i.e., the broadcasting device information, as an initial broadcast in response to D2D mode activation of the broadcasting device. At 1610, the broadcasting device 300 may receive device information from another device in the D2D virtual mesh network 140.

At 1615, the device 300 may determine whether the received device information is new device information (i.e., device information of a new device joining the D2D virtual mesh network) or device information of a device already stored in the device information logs. To determine if the received device information is new device information, the device 300 may, for example, analyze the received device information, retrieve device ID information from the received device information, and compare the retrieved device ID information to device ID information stored in the device information logs of the device 300.

If the received device information is new device information, then at 1620, the device 300 may broadcast the received device information according to a new device broadcast sequence. The new device broadcast sequence may be a predetermined sequence stored, for example, in the storage component 230. The processor 210 may control the communication interface 260 and/or the output component 250 to broadcast the received device information in accordance with the new device broadcast sequence in response to determining that the received device information is new device information (i.e., device information for a device in the D2D virtual mesh network not previously logged). In an embodiment, the new device broadcast sequence includes broadcasting the new device information in two consecutive broadcasts from the device 300. The new device broadcast sequence is different than the initial broadcast (where device information of the broadcasting device is broadcast) and a D2D virtual mesh network broadcast sequence, described further below.

At 1625, the device 300 may store the received device information in the device information log(s). At 1630, the device 300 may analyze the device information of all devices stored at the device information logs in the storage component 230, and at 1635, the device 300 may determine the D2D broadcast sequence based on analysis of the stored device information. In an embodiment, the device 300 analyzes the most recently stored device information for each device. In an embodiment, device information may be time stamped.

The D2D broadcast sequence may be determined based on one or more aspects of the device information for each device stored in the device information logs. For example, in an embodiment, the D2D broadcast sequence is determined based on the broadcasting device, the proximity information, and the battery information. In an embodiment, the device information for the devices of the D2D virtual mesh network may be ordered in the broadcast sequence such that device information for non-visible devices may be broadcast before device information for visible devices. In an embodiment, the device information for the devices may be further ordered in the broadcast sequence based on the battery information. For example, the device information of the non-visible devices may be ordered in an ascending or descending order based on battery TTL, and device information for visible devices may be ordered in ascending or descending order based on battery TTL. Further, in an embodiment, device information of the broadcasting device may be included in the broadcast sequence to be included with every other broadcast.

If the received device information is determined to not be new device information at 1615, then in an embodiment, at 1640, the device 300 may broadcast device information for devices of the D2D virtual mesh network according to the D2D broadcast sequence.

Figure 17:
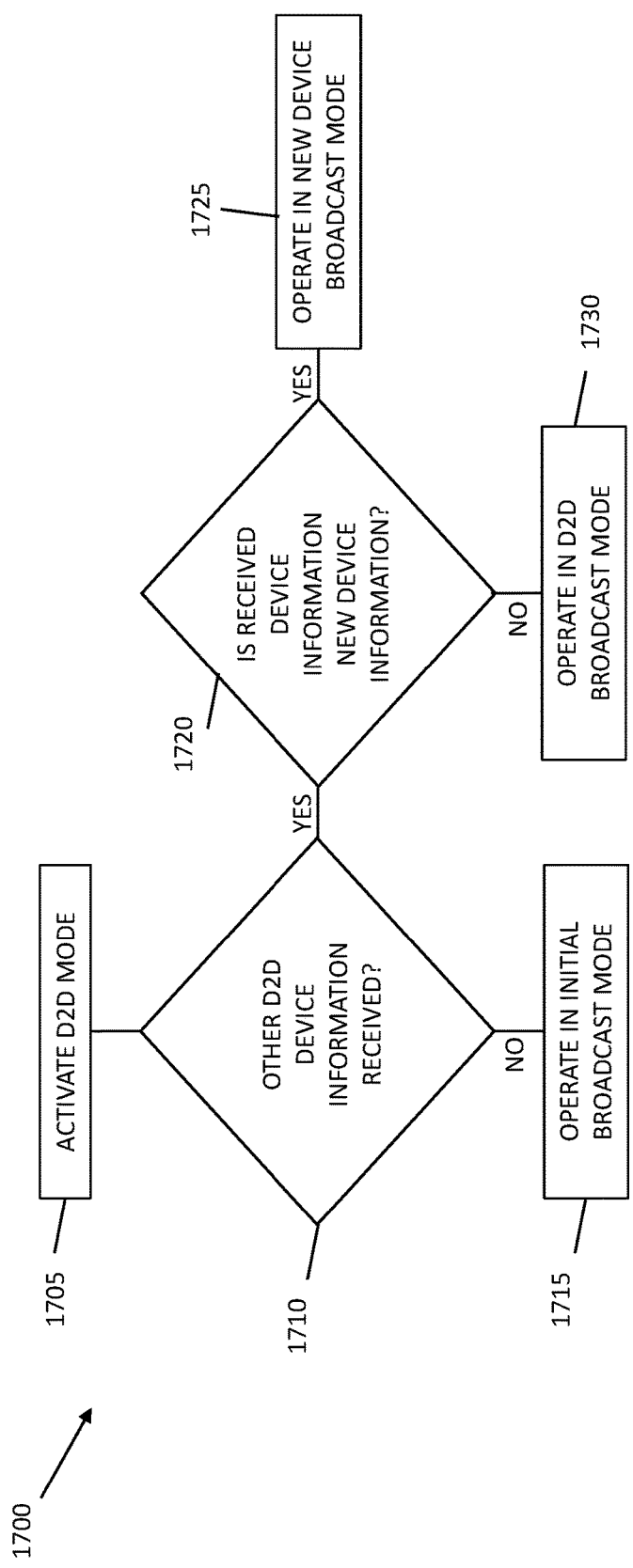
FIG. 17 is a block diagram illustrating an example of a method for determining a broadcast mode of a device, according to an embodiment.

FIG. 17 is a block diagram illustrating an example of a method 1700 for determining a broadcast mode of a device in a D2D virtual mesh network. In an embodiment, at 1705, the D2D mode is activated at the device 300.

At 1710, the device 300 may determine whether device information from other devices operating in D2D mode has been received. For example, the processor 210 may analyze device information logs (if any) at the storage component to determine if any device information of other devices has been received and stored. If device information of other devices is not found in the storage component 230, then at 1715, the device 300 may operate in initial broadcast mode. In the initial broadcast mode, the device 300 broadcasts its own device information at predetermined intervals.

At 1710, if the device 300 determines that device information from other devices operating in D2D mode has been received, then at 1720, the device 300 may determine whether the received device information is new device information of a new device operating in D2D mode, or existing device information of a device operating in D2D mode from which the device 300 has previously received device information.

At 1720, if the received device information is new device information of a new device operating in D2D mode, then at 1725, the device 300 may operate in new device broadcast mode. The device 300 may determine whether the received device information is new device information, for example, by identifying device ID information in the device information and comparing to device ID information stored in the storage component 230, for example, in the device information log(s). If the device ID information of the received device information does not match stored device ID information of stored device information, then the device 300 may determine that the received device information is new device information and operate in the new device broadcast mode.

In the new device broadcast mode, the device 300 broadcasts the device information received from the new device in a predetermined sequence. For example, the device 300 may broadcast the device information of the new device in two consecutive broadcasts. In an embodiment, the new device broadcast sequence may supersede any ongoing broadcast sequence. That is, the device 300 may switch from an existing or ongoing broadcast mode to operate in the new device broadcast mode in response to receiving new device information.

At 1720, if the device 300 determines that the received information is not new device information, or that the received information is from a device for which device information has been previously received, then at 1730, the device 300 may operate in D2D broadcast mode. In an embodiment, the device 300 may determine that received information is not new device information or is previously received device information by identifying device ID information in the received device information and comparing to device ID information stored in the storage component 230. If device ID information of the received device information matches stored device ID information, then the device 300 may determine that the received device information is not new device information or is received from a device for which device information gas been previously received.

In the D2D broadcast mode, the device 300 may broadcast device information received from other devices in the D2D virtual mesh network according to a D2D broadcast sequence, such as the D2D broadcast sequence described in the embodiments above.

In embodiments herein, functions, methods and/or other actions described with respect to the device 300 (or other devices in the D2D virtual mesh network) may be performed, for example, by the processor 210 of a device executing program instructions stored at the device, for instance, in a non-transitory computer-readable medium such as the system memory 220 and/or the storage component 230. The processor 210, in response to executing the program instructions, may control or operate other components of the device, such as input component 240, output component 250 and/or communication interface 260 to perform the functions, methods, and/or other actions described in relation to the device 300. For example, device information may be received at the device 300 via the communication interface 260 and/or the input component 240, and further, may be received by the processor 210 via the communication interface 260 and/or the input component 240.

In addition, device information may be broadcast by the device 300, for example, by way of the processer 210 controlling the communication interface 260 and/or the output component 250, in response to executing program instructions. The processor 210 may also, in response to executing program instructions, generate, interpret, analyze, retrieve, store, update, compare, or otherwise process, the device information.

Accordingly, a device 300 having the components above may perform a computer-implemented method, such as the methods described in the embodiments herein, including, but not limited to, the methods described herein with reference to FIGS. 13-17. It is understood that the methods and method steps described herein need not necessarily be performed in the order described or shown in the accompanying drawings.

In embodiments herein, the devices may communicate by broadcasting device information in packets. In embodiments, the devices may broadcast eight different packets at their maximum/allowed transmission power, including: a chatroom packet, a device broadcast packet, a broadcast packet of a recently logged visible device, a broadcast packet of a recently logged non-visible device, a visible device broadcast packet, a non-visible device broadcast packet, a critical battery packet, and a chatroom packet of a discovered device. In embodiments, the devices 300 may communicate using BLE, however, other suitable communication techniques are envisioned for use with the embodiments herein, including, but not limited to, WiFi direct, LoRa, NB-IoT and the like.

A device receiving the device information packets from another device or devices may distinguish the type of device information packet using status bits set in the broadcast beacons.

The D2D virtual mesh network may provide a chatroom for user-to-user (device-to-device) communication. In an embodiment, a user can use chatroom packets to broadcast 85-bits long strings of information.

In an embodiment, the device broadcast packets provide information about the devices. For example, the device broadcast packets may contain device IDs, location information such as geodetic coordinates, and the number of discovered devices.

In an embodiment, the broadcast packets of a recently logged visible device can provide information about recently discovered visible devices. The broadcast packets of recently logged visible devices may device IDs, location information such as geodetic coordinates and proximity information of discovered devices.

In an embodiment, the broadcast packets of a recently logged non-visible device can provide information about recently discovered non-visible devices. For example, the broadcast packets of recently logged non-visible devices may contain device IDs, location information such as geodetic coordinates and proximity information of the discovered devices.

In an embodiment, the broadcast packets of a visible device can provide information of discovered visible devices. The broadcast packets of visible devices may contain device IDs, location information such as geodetic coordinates and proximity information of visible devices.

In an embodiment, the broadcast packets of a non-visible device can provide information about discovered non-visible devices. For example, the broadcast packets of a non-visible device may include device IDs, location information such as geodetic coordinates and proximity information of non-visible devices.

In an embodiment, the critical battery packets can signify a critical battery condition. Devices receiving a critical battery packet prioritize the device having the critical battery condition in response to receiving this information. The critical battery packets may include device IDs, location information such as geodetic coordinates and the number of discovered devices.

In an embodiment, chatroom packets of a discovered device may contain messages received by the discovered devices. The chatroom packets of a discovered device may be broadcast through the D2D virtual mesh network if a network bit number 22 is set to 1.

In an embodiment, a user of a device 300 in the D2D virtual mesh network 140 may operate the device 300 to transmit a message to one or more other devices 300 in the D2D virtual mesh network 140 and/or the mobile information collection device 150. In an embodiment, a device 300 may receive the message and analyze the content of the message. The device 300 may prioritize the message or messages into categories based, for example, on an urgency to respond or provide resources. For instance, the device 300 may categorize messages as being critical, moderate and light. A first responder, or other personnel reviewing the categorized messages may then efficiently allocate resources and supplies to locations corresponding the devices based on the category of message. For example, a first responder may first allocate resources to a location from which a device has sent a message categorized as urgent (or highest priority).

In an embodiment, a device 300 and/or a mobile information collection device 150 may analyze messages for example, by analyzing the text of those messages for words indicative of varying levels of urgency and categorize the messages accordingly. In an embodiment, the device 300 and/or mobile information collection device 150 may utilize artificial intelligence (AI) and/or machine learning (ML) algorithms to analyze the text of the messages and categorize the messages accordingly. Such algorithms may be configured to predict, detect and/or analyze a severity of an emergency in each geographic area based on, for example, the content of the message, a population density, and/or other relevant factors.

In embodiments above, the D2D virtual mesh network 140 may be a connectionless network, in that connections are not created between devices 300 of the network 140. Instead, the devices 300 may communicate via broadcasts, such as advertisements in beacons. In this manner, handshakes and/or acknowledgements associated with conventional connections between devices may be avoided, and indeed, are not required, in the embodiments above. Accordingly, embodiments herein, when compared to a conventional handshake/acknowledgement connection, may disseminate the device information directly to one or more other devices in a single broadcast, may transmit the device information more quickly because handshakes and acknowledgments may be omitted, and less power (e.g., battery power) may be required.

In present embodiments, due to formation of a virtual mesh, connections are not formed between devices and the device, system and methods described herein may operate independently of network infrastructure. Moreover, the devices, systems and methods herein may operate independently of radio access technology (RAT) due to the broadcast-based communications.

In addition, in embodiments above, devices 300 in the D2D virtual mesh network 140 may collect device information from other devices in the D2D virtual mesh network 140, and a mobile information collection device can retrieve the aggregated device information from any device of the D2D virtual mesh network 140. That, the device 300 of the embodiments herein collect device information from the other devices and broadcast that device information to further devices, without using devices as relays.

Further, in embodiments herein, a base station or similar network infrastructure is not required at any point during operation of the D2D virtual mesh network for the devices to collect device information from the other devices. At a later time, devices 300 of the present embodiments may transfer the collected device information to another device, which may include a base station.

Further still, in embodiments herein, the battery information may include TTL information, which allows for prioritization of broadcasts based on, for example, remaining battery life of a device.

Additionally, in embodiments herein, the device information may include location information such as geodetic coordinates, which may allow for device locations to be accurately obtained. In embodiments, the device information may also include a phone number of the device as the Device ID information, which may allow for quick identification of a device and in some scenarios, means for contacting the device.

It is understood that the features described with respect to any of the embodiments above may be implemented, used together with, or replace features described in any of the other embodiments above. It is also understood that description of some features may be omitted in some embodiments, where similar or identical features are discussed in other embodiments. In addition, in some embodiments, the method steps and processes need not necessarily be carried out in the order described or shown in the drawings so long as the same or substantially similar result may be achieved when varying the order of the steps.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular. In addition, in is understood that terminology referring to directions or relative orientations, such as, but not limited to, "upper" "lower" "raised" "lowered" "top" "bottom" "above" "below" "alongside" "left" and "right" are used for purposes of example and do not limit the scope of the subject matter described herein to such orientations or relative positioning.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A computer-implemented device-to-device (D2D) communication method for proximity based connectionless D2D communications between a plurality of devices via a virtual mesh network when cellular communication is unavailable, the plurality of devices including at least a first device, a second device and a third device, the method comprising:

broadcasting an initial first device broadcast by the first device, the initial first device broadcast containing first device information, wherein the first device has a first device broadcasting range;

broadcasting an initial second device broadcast by the second device, the initial second device broadcast containing second device information, wherein the second device has a second device broadcasting range and wherein the second device is in the first device broadcasting range and the first device is in the second device broadcasting range;

receiving, by the first device without handshakes or acknowledgement, the initial second device broadcast;

receiving, by the second device without handshakes or acknowledgement, the initial first device broadcast;

broadcasting a subsequent first device broadcast by the first device, the subsequent first device broadcast containing the second device information, the subsequent first device broadcast being received by the second device without handshakes or acknowledgement;

broadcasting a subsequent second device broadcast by the second device, the subsequent second device broadcast containing the first device information, the subsequent second device broadcast being received by the first device without handshakes or acknowledgement;

broadcasting a tertiary first device broadcast by the first device, the tertiary first device broadcast containing the first device information and the second device information, the tertiary first device broadcast being received by the second device without handshakes or acknowledgement;

broadcasting a tertiary second device broadcast by the second device, the tertiary second device broadcast containing the first device information and the second device information, the tertiary second device broadcast being received by the first device without handshakes or acknowledgement;

broadcasting an initial third device broadcast by the third device, the initial third device broadcast containing third device information, wherein the third device has a third device broadcasting range and wherein the third device is in the second device broadcasting range and the third device is out of the first device broadcasting range;

receiving, by the second device without handshakes or acknowledgement, the initial third device broadcast;

broadcasting a fourth second device broadcast by the second device, the fourth second device broadcast containing first device information, second device information, and third device information, wherein the first device and third device receive the fourth second device broadcast without handshakes or acknowledgement;

broadcasting a fourth first device broadcast by the first device, the fourth first device broadcast containing the first device information, the second device information, and the third device information, the fourth first device broadcast being received by the second device without handshakes or acknowledgement; and broadcasting a subsequent third device broadcast by the third device, the subsequent third device broadcast containing the first device information, the second device information, and the third device information, the subsequent third device broadcast being received by the second device without handshakes or acknowledgement.

2. The computer-implemented method of claim 1, further comprising transmitting, by at least one of the plurality of devices, one or more of the first device information, second device information, third device information, and fourth device information to a mobile information collection device.

3. The computer-implemented method of claim 1, wherein at least one of the first device information, second device information, third device information, and fourth device information includes device ID information and location information.

4. The computer-implemented method of claim 1, wherein at least one of the first device information, second device information, third device information, and fourth device information proximity information and/or battery information.

5. The computer-implemented method of claim 4, further including determining, by at least one of the first device, second device, third device, and fourth device, a broadcast sequence based on one or more of the proximity information and/or battery information.

\* \* \* \* \*